United States Patent

Fu et al.

(10) Patent No.: US 8,068,549 B2
(45) Date of Patent: *Nov. 29, 2011

(54) TRELLIS DECODER FOR DECODING DATA STREAM INCLUDING SYMBOLS CODED WITH MULTIPLE CONVOLUTIONAL CODES

(75) Inventors: Haosong Fu, Levittown, PA (US); Azzedine Touzni, Doylestown, PA (US); Raghuram Behara, Langhorne, PA (US); Ajay Bhaskaran, Bensalem, PA (US); Samir N. Hulyalkar, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/796,463

(22) Filed: Jun. 8, 2010

(65) Prior Publication Data

US 2010/0246733 A1     Sep. 30, 2010

Related U.S. Application Data

(63) Continuation of application No. 10/973,486, filed on Oct. 26, 2004, now Pat. No. 7,733,972.

(51) Int. Cl.
*H04L 5/12* (2006.01)
*H04L 23/02* (2006.01)

(52) U.S. Cl. .......................... 375/265; 714/792

(58) Field of Classification Search .................. 375/265, 375/340; 714/792, 786

See application file for complete search history.

(56) References Cited

U.S. PATENT DOCUMENTS

| 4,905,317 | A * | 2/1990 | Suzuki et al. | 341/51 |
|---|---|---|---|---|
| 6,253,347 | B1 * | 6/2001 | Koslov | 714/789 |
| 6,408,420 | B1 * | 6/2002 | Todoroki | 714/795 |
| 6,654,929 | B1 * | 11/2003 | Kamada | 714/795 |
| 6,877,125 | B2 * | 4/2005 | Le Bars et al. | 714/755 |
| 7,194,047 | B2 * | 3/2007 | Strolle et al. | 375/341 |
| 7,278,088 | B2 * | 10/2007 | Tsai et al. | 714/795 |
| 7,467,359 | B2 * | 12/2008 | Potkonjak et al. | 716/1 |
| 7,630,461 | B2 * | 12/2009 | Cameron | 375/341 |

(Continued)

OTHER PUBLICATIONS

Advanced Television Systems Committee, ATSC Digital Television Standard, Sep. 16, 1995.

(Continued)

*Primary Examiner* — Jean B Corrielus
(74) *Attorney, Agent, or Firm* — McAndrews, Held & Malloy, Ltd.

(57) ABSTRACT

A trellis decoder decodes a stream of encoded symbols, including symbols of a first type (e.g. symbols encoded with a first trellis code) and symbols of a second type (e.g. encoded with a second, more robust, trellis code), without storing path indicators along a trellis for symbols of the first type. In this way, limited memory may be used to store path indicators along the trellis for symbols of the second type. This allows for more accurate decoding of the symbols of the second type. For transitions from symbols of the second type to symbols of the first type, states of the trellis decoder may be stored. In this way, paths may be traced back along the trellis for trellis decoding, without the path indicators for the symbols of the first type.

6 Claims, 21 Drawing Sheets

U.S. PATENT DOCUMENTS

| | | |
|---|---|---|
| 2002/0001349 A1 | 1/2002 | Bretl et al. |
| 2002/0194570 A1* | 12/2002 | Birru et al. .................... 714/792 |
| 2003/0115061 A1* | 6/2003 | Chen ............................ 704/240 |
| 2004/0028076 A1 | 2/2004 | Strolle et al. |
| 2004/0057535 A1 | 3/2004 | Strolle et al. |
| 2004/0158798 A1* | 8/2004 | Senda et al. .................. 714/792 |
| 2007/0237263 A1* | 10/2007 | Strolle et al. ................. 375/321 |
| 2009/0100319 A1* | 4/2009 | Potkonjak et al. ............ 714/792 |

OTHER PUBLICATIONS

Lin, et al., "Error Control Coding," 1983, pp. 287-312, 315-346, Prentice-Hall, Englewood Cliffs, New Jersey.

* cited by examiner

INPUT =

|   | 0 | 1 | 2 | 3 | 4 | 5 | 6 | 7 |
|---|---|---|---|---|---|---|---|---|
|   | 5 | -1 | -1 | -3 | 5 | 3 | -7 | -5 | d =

| 144 | 36 | 36 | 16 | 144 | 100 | 0 | 4 |
|---|---|---|---|---|---|---|---|
| 100 | 16 | 16 | 4 | 100 | 64 | 4 | 0 |
| 64 | 4 | 4 | 0 | 64 | 36 | 16 | 4 |
| 36 | 0 | 0 | 40 | 36 | 16 | 36 | 16 |
| 16 | 4 | 4 | 16 | 16 | 4 | 64 | 36 |
| 4 | 16 | 16 | 36 | 4 | 0 | 100 | 64 |
| 0 | 36 | 36 | 64 | 0 | 4 | 144 | 100 |
| 4 | 64 | 64 | 100 | 4 | 16+ | 196 | 144 |

PM =

| | | | | | | | | |
|---|---|---|---|---|---|---|---|---|
| [0] | 208 | 188 | 192 | 100 | 80 | 124 | 124 | 116 |
| [1] | 136 | 224 | 116 | 80 | 100 | 156 | 0 | 164 |
| [2] | 212 | 80 | 100 | 120 | 180 | 0 | 160 | 0 |
| [3] | 156 | 100 | 80 | 84 | 92 | 116 | 120 | 120 |
| [4] | 80 | 212 | 192 | 100 | 116 | 84 | 120 | 84 |
| [5] | 100 | 216 | 84 | 80 | 136 | 184 | 64 | 132 |
| [6] | 184 | 80 | 100 | 152 | 84 | 64 | 156 | 64 |
| [7] | 188 | 100 | 80 | 116 | 88 | 92 | 84 | 184 |
| [8] | 184 | 188 | 84 | 64 | 120 | 120 | 80 | 160 |
| [9] | 64 | 84 | 216 | 180 | 0 | 152 | 100 | 124 |
| [10] | 220 | 180 | 64 | 84 | 152 | 100 | 128 | 100 |
| [11] | 84 | 64 | 180 | 88 | 116 | 80 | 220 | 80 |
| [12] | 120 | 220 | 116 | 0 | 152 | 88 | 116 | 120 |
| [13] | 0 | 116 | 224 | 116 | 64 | 120 | 104 | 120 |
| [14] | 224 | 116 | 0 | 120 | 120 | 100 | 116 | 172 |
| [15] | 116 | 0 | 116 | 184 | 84 | 80 | 156 | 120 | py =

| | | | | | | | | |
|---|---|---|---|---|---|---|---|---|
| [0] | 0 | 1 | 1 | 1 | 1 | 1 | 0 | 1 |
| [1] | 1 | 1 | 0 | 1 | 1 | 1 | 0 | 0 |
| [2] | 1 | 1 | 1 | 0 | 0 | 1 | 0 | 0 |
| [3] | 1 | 1 | 1 | 0 | 1 | 1 | 0 | 0 |
| [4] | 1 | 1 | 1 | 0 | 1 | 1 | 0 | 0 |
| [5] | 1 | 1 | 1 | 0 | 1 | 1 | 0 | 0 |
| [6] | 1 | 0 | 0 | 1 | 1 | 0 | 0 | 1 |
| [7] | 1 | 0 | 0 | 1 | 1 | 1 | 0 | 1 |
| [8] | 0 | 0 | 0 | 1 | 1 | 0 | 0 | 0 |
| [9] | 0 | 0 | 0 | 1 | 1 | 0 | 0 | 0 |
| [10] | 1 | 1 | 1 | 0 | 0 | 1 | 0 | 0 |
| [11] | 1 | 1 | 1 | 0 | 0 | 1 | 0 | 0 |
| [12] | 1 | 1 | 1 | 0 | 1 | 1 | 0 | 0 |
| [13] | 1 | 1 | 0 | 0 | 0 | 1 | 0 | 0 |
| [14] | 1 | 0 | 0 | 0 | 1 | 0 | 0 | 0 |
| [15] | 0 | 0 | 0 | 1 | 1 | 0 | 0 | 0 |

FIG. 7D

TRELLIS DECODER FOR DECODING DATA STREAM INCLUDING SYMBOLS CODED WITH MULTIPLE CONVOLUTIONAL CODES

CROSS REFERENCE TO RELATED APPLICATIONS

The present application is a continuation of U.S. patent application Ser. No. 10/973,486, filed Oct. 26, 2004, now U.S. Pat. No. 7,733,972, the entire contents of which are hereby incorporated herein by reference.

FIELD OF THE INVENTION

The present invention relates generally to trellis decoders, and more particularly to trellis decoders for decoding data streams including symbols coded with two convolutional codes. Such trellis decoders are particularly useful in digital television receivers using an enhanced digital transmission standard, such as, for example, the recently approved enhanced vestigial side band ("EVSB") digital television standard.

BACKGROUND OF THE INVENTION

The high definition television (HDTV) standard for U.S. terrestrial television broadcasts, known as 8 vestigial sideband (8-VSB) modulation was adopted in 1995 by the Advanced Television System Committee (ATSC). The standard (known as the "8-VSB ATSC standard") specifies single carrier modulation designed for broadcast of high quality video, audio and ancillary data, which supports a payload up to 19.39 Mbps data over a 6 MHz bandwidth channel. Encoded compressed video and AC-3 audio sub-streams are multiplexed with data and service information in packets in an MPEG2 packet stream. The packets are multiplexed and broadcast into the UHF/VHF television spectrum band with an 8-VSB modulator.

In the 8-VSB ATSC standard forward error correcting (FEC) coding techniques are employed to protect the transmitted data against noise. Transmitted data is first coded using a Reed Solomon (R/S) coder and then further coded using a trellis coder Details are given in A53-Annex C. The R/S encoder uses a R/S block code that codes 187 byte blocks into 207 byte blocks, allowing up to 10 bytes of error correction. Each byte of data is segmented into four groups of 2-bit nibbles (x1, x2) prior to being coded with the trellis coder. More precisely, each 2-bit nibble is mapped (coded) using a ⅔ trellis code into a three bit symbol which is associated to points in the signal set $\{-7, -5, -3, -1, +1, +3, +5, +7\}$. Each trellis coded symbol is modulated using an 8-level VSB signal.

As a result, a receiver detects modulated signals using a conventional trellis decoding algorithm (such as, for example, the Viterbi algorithm), reducing the likelihood of errors. Additional remaining errors in the decoded stream may be corrected using the R/S codes in stream.

More recently, an enhanced 8-VSB coding technique (EVSB) has been proposed to add flexibility to the 8-VSB standard. Aspects of the EVSB technique are described in U.S. Patent Publication 2004/0028076, the contents of which are hereby incorporated by reference. Notably, EVSB allows for greater immunity to noise than the 8-VSB ATSC standard by including additional coding. Coded symbols within EVSB that are more resistant to noise are referred to as "robust symbols". Roughly, EVSB robust symbols divide the signal to noise threshold of visibility by two at the cost of reducing the data rate by about the same factor. At the same time, EVSB is backward compatible with the existing 8-VSB ATSC standard. Additionally, 8-VSB ATSC compliant, legacy receivers that are not able to demodulate EVSB robust symbols, seamlessly discard these symbols without jeopardizing normal symbols reception Bytes encoded using a robust trellis (hereinafter "robust bytes") and bytes encoded using conventional VSB coding (hereinafter "normal bytes") may be interleaved. The interleaving of robust bytes and normal bytes results in interleaved robust/normal symbols formed using two different convolutional codes. As a consequence, an EVSB capable receiver should be able to decode a stream of symbols formed from two different trellis codes. Convolutional and trellis codes are for example detailed in Lin, Shu & d. Costello, *Error Control Coding*, Prentice-Hall, 1983, the contents of which are hereby incorporated herein by reference.

To this end, the robust convolutional code leading to the generation of the robust symbols (via a trellis code) is chosen so that normal symbols in a normal/robust stream can be decoded by a conventional 8-VSB trellis decoder. At the same time, a conventional trellis decoder similar to the one used for 8-VSB encoding but adapted to the EVSB trellis coder can decode both normal and robust symbols in the stream.

As will be appreciated, trellis codes are convolutional codes that encode sequences of symbols, rather than individual symbols. As such, the performance of a trellis decoder typically depends on the number of symbols used to produce each individual decoded symbol. The number of symbols used is also often referred to as the "window" of received symbols. A minimum length window is required to achieve acceptable performance. Practically, the length of the window is fixed and limited by hardware cost. In an EVSB stream, the number of robust symbols and normal symbols received vary in dependence on the mix of normal and robust symbols sent by the transmitter, as controlled by the broadcaster. Because normal symbols are less immune to noise than robust symbols, the ability to estimate the robust symbols depends on how many robust symbols are in the window. This will typically be affected by the number of normal symbols within the window. In particular, to achieve adequate estimations of robust symbols at a low robust to normal symbol ratio, the length of window needs to be large, and is often impractical.

Accordingly, there is a need for an improved receiver that allows for optimum performance for the estimate of robust symbols with a fixed window length used to decode streams including robust and normal symbols.

SUMMARY OF THE INVENTION

In accordance with an aspect of the present invention, a stream of encoded symbols, including symbols of a first type (e.g. normal symbols) and symbols of a second type (e.g. robust symbols), is trellis decoded without storing path indicators along a trellis for symbols of the first type. In this way, limited memory may be used to store path indicators along the trellis for symbols of the second type (e.g. robust symbols). This allows for more accurate decoding of the symbols of the second type. For transitions from symbols of the second type to symbols of the second type, states of the trellis decoder may be stored. In this way, paths may be traced back along the trellis for trellis decoding, without the path indicators for the symbols of the first type.

In accordance with another aspect of the present invention, a stream of encoded symbols, including symbols of a first type (e.g. normal symbols) and symbols of a second type (e.g.

robust symbols), is trellis decoded. Typically the encoded stream has been interleaved. A multiplexed stream including only decoded symbols of the second type along with place holders representing symbols of the first type is output. The multiplexed stream may be de-interleaved to extract information in the symbols of the second type.

In accordance with a further aspect of the present invention, there is provided a method of trellis decoding symbols within a stream of symbols. The stream includes symbols of a first type and a second type. The symbols of the first type are encoded using a first convolutional code, and the symbols of the second type are encoded using a second convolutional code. The method includes, for an arriving symbol: a. calculating an incremental error metric for each leg of at least two arriving paths for each state of the trellis decoder; b. calculating a path error metric for a path through each state of the trellis decoder including a previous path error metric for that path and the minimum incremental error metric for the at least two arriving paths for the each state; c. for arriving symbols of the first type, storing states of the trellis decoder along each of the paths as those states existed immediately prior to symbols of the second type along each of the paths; d. for arriving symbols of the second type, storing in memory a path indicator of each leg of each path associated with the minimum incremental error for that state; and e. using the stored path indicators and the stored states to trace back along one of the candidate paths to decode a symbol of the second type in the stream.

In accordance with yet another aspect of the present invention there is provided a trellis decoder for decoding symbols within a stream of symbols of a first type and a second type. The symbols of the first type are encoded using a first convolutional code, the symbols of the second type encoded using a second convolutional code. The decoder includes a path metric calculator for calculating a path error metric for a path through each state of the trellis decoder along a first trellis including a previous path error metric for that path and the minimum incremental error metric for at least two arriving paths for the each state; path metric registers for storing path metrics for each state along the first trellis; memory for storing states of the trellis decoder along each of the paths along the first trellis for arriving symbols of the first type, as those states existed immediately prior to arriving symbols of the second type along each of the paths; path memory for storing in memory a path indicator of each leg of each path associated with the minimum incremental error for that state along the first trellis, for arriving symbols of the second type; a path trace-back calculator in communication with the memory, the path memory, and the path metric registers for using said stored path indicators and said stored states to trace back along a path to associated with a minimum path error metric to decode a symbol in the stream.

In accordance with yet another aspect of the present invention, a method of decoding a multiplexed stream including encoded symbols of a first type and encoded symbols of a second type, includes: decoding symbols of said second type from said stream; generating place holder symbols, one of said place holder symbols for each of said symbols of said first type; outputting a multiplexed stream of said decoded symbols of said second type, and said place holder symbols.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIGS. 7C and 7D depicts example calculations performed by the trellis decoder of FIG. 7A;

DETAILED DESCRIPTION

Figure 1:
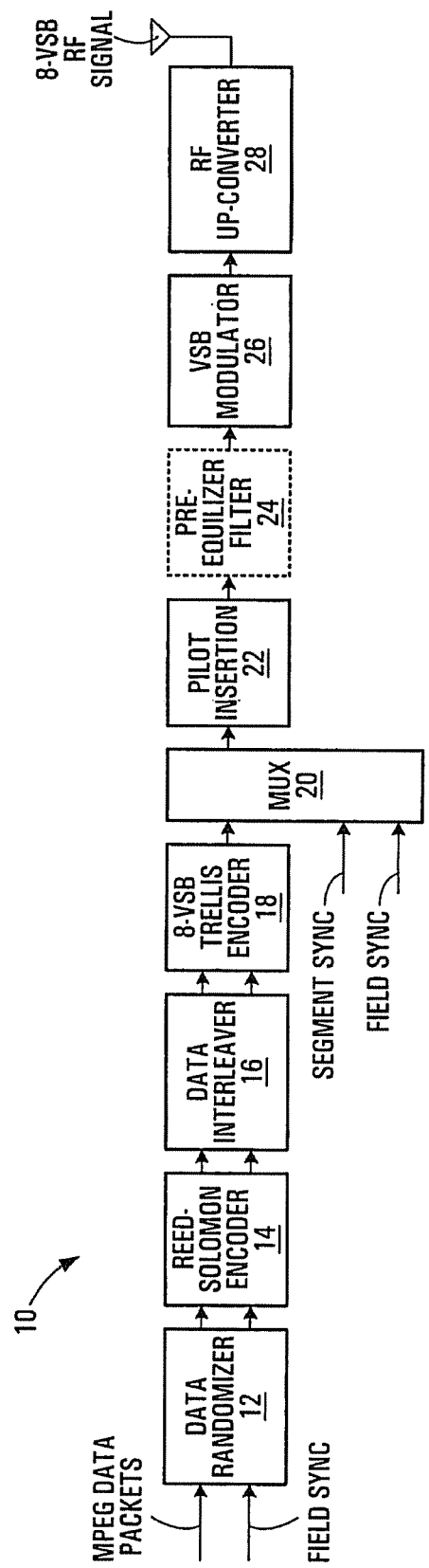
FIG. 1 is a simplified schematic diagram of a conventional 8-VSB transmitter.

FIG. 1 illustrates a conventional 8-VSB transmitter 10 compliant with the ATSC A/53 standard. As illustrated, transmitter 10 includes a data randomizer 12 for receiving MPEG2 compliant packets each having 187 bytes. The output of data randomizer 12 feeds a (207,187) Reed Solomon (R/S) encoder 14. The output of R/S encoder 14 is provided to a data interleaver 16 that interleaves bytes. Interleaved data is provided as a bit stream to trellis coder 18. Trellis coder 18 uses twelve individual, identical ⅔ trellis coders as detailed below to output a sequence of symbols s from the input stream. Each symbol s produced by trellis encoder 18 is an element of the set {−7, −5, −3, −1, +1, +3, +5, +7}. Multiplexer 20 multiplexes symbols s with segment and field synch information. The multiplexed stream of symbols and segment and field synch information is provided to pilot insertion block 22, and a pilot signal (DC offset) is inserted into the stream. Optionally, the stream is pre-equalized at pre-equalizer 24. Thereafter, the pre-equalized signal or pilot insertion block 22 output is provided to VSB modulator 26, where each symbol is modulated using VSB modulation. The output of VSB modulator is a baseband signal that is provided to RF up-converter 28, where it is translated onto a desired RF television channel at an assigned frequency, and transmitted.

Figure 2A:
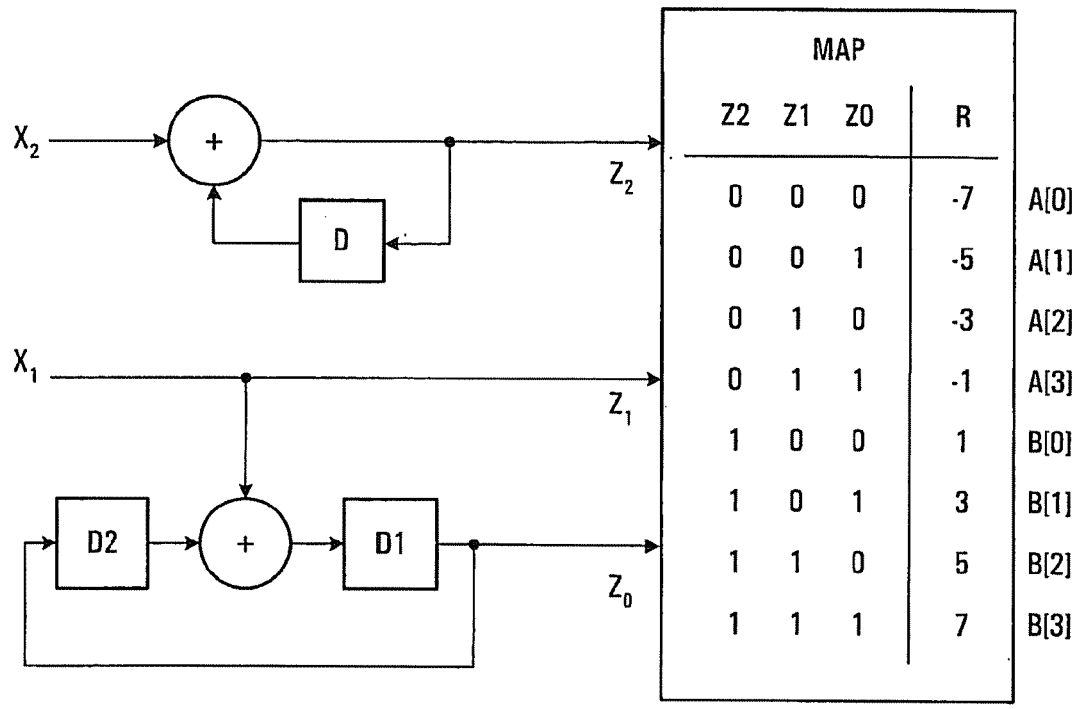
FIG. 2A is a simplified schematic diagram of one of twelve trellis coders used in 8-VSB transmitter of FIG. 1.
Figure 2B:
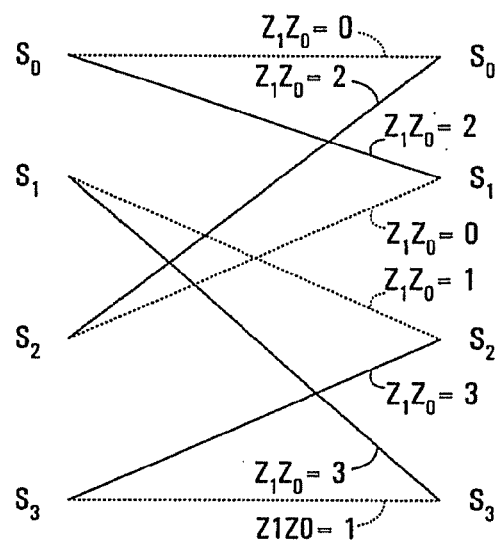
FIG. 2B is a trellis diagram corresponding to the trellis code used by the trellis coder of FIG. 2A.

FIG. 2A illustrates one of the twelve trellis coders used in trellis coder 18. As illustrated, trellis coder 18 operates on two bit portions (nibbles) x2, x1 of the output of data interleaver 16, to provide three bit groups z2,z1,z0. Each group of three bits z2, z1, z0 is mapped into one symbol. The corresponding trellis state transition diagram for x1 is illustrated in FIG. 2B. Notably, bit z2 is not correlated to bits z1, z0.

Figure 2C:
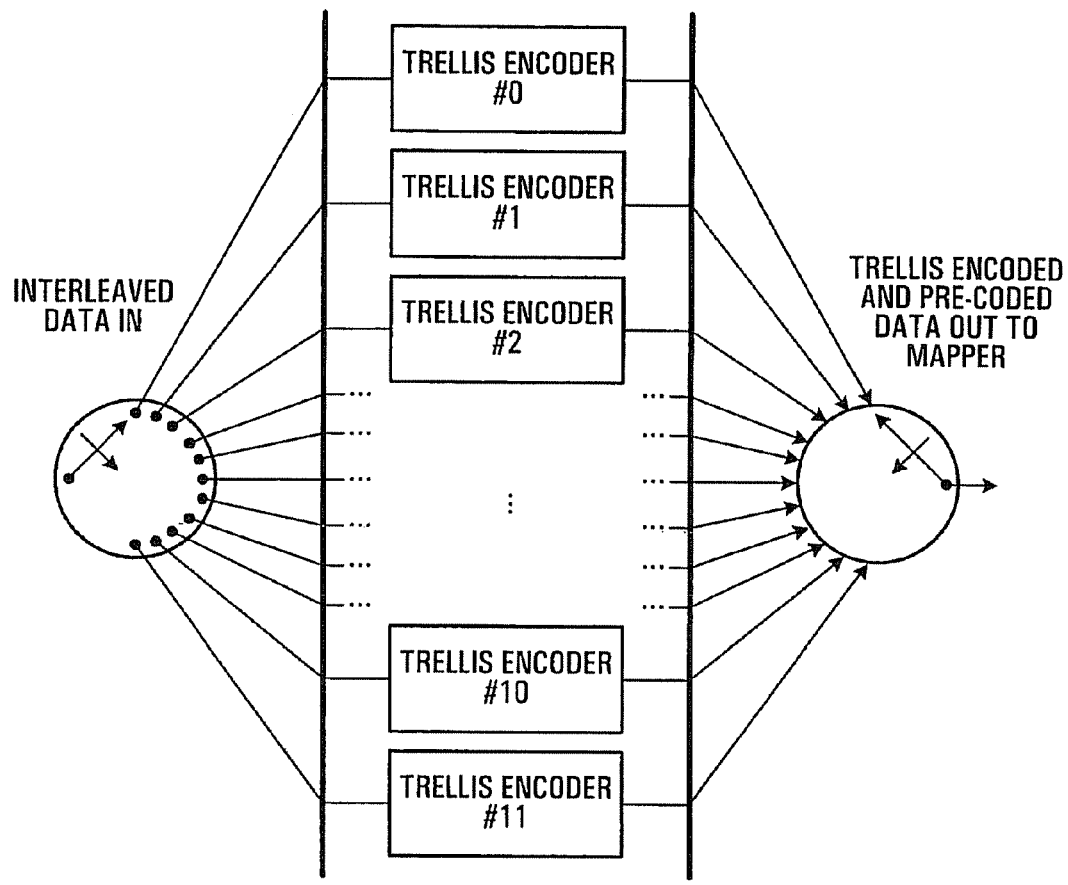
FIG. 2C is a simplified schematic diagram of twelve combined trellis coders of the type illustrated in FIG. 2A.

As noted, trellis coder 18 includes twelve (12) individual, identical trellis coders which advance interleave the data, each of which encodes a nibble into three bit encoded symbols. Each of the twelve trellis decoders is used for each twelfth symbol within the stream to be encoded, as illustrated in FIG. 2C. Additional details may found in ATSC Standard A/53, the contents of which are hereby incorporated by reference.

Figure 3A:
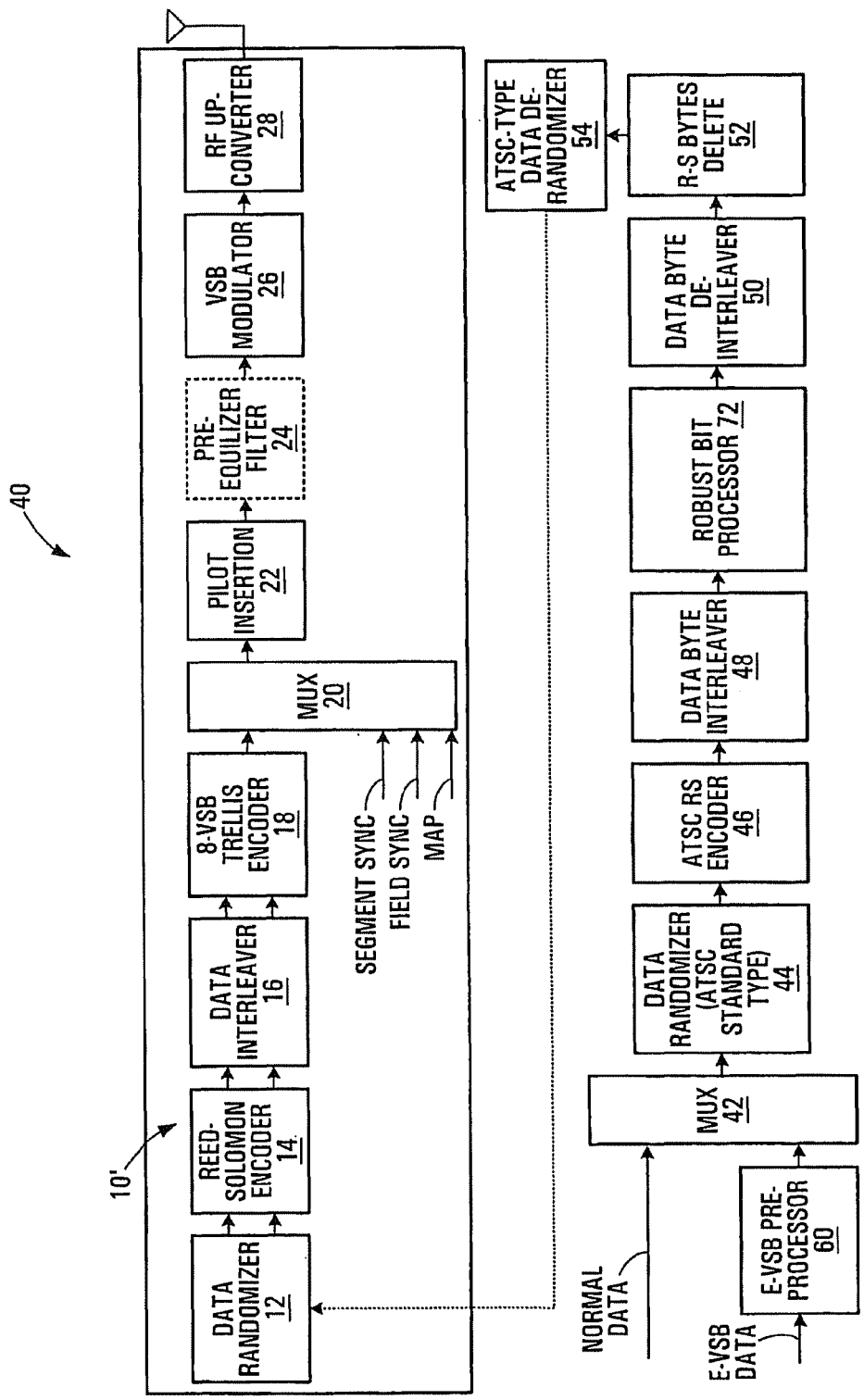
FIG. 3A is a simplified schematic block diagram of an enhanced VSB (EVSB) transmitter.
Figure 3B:
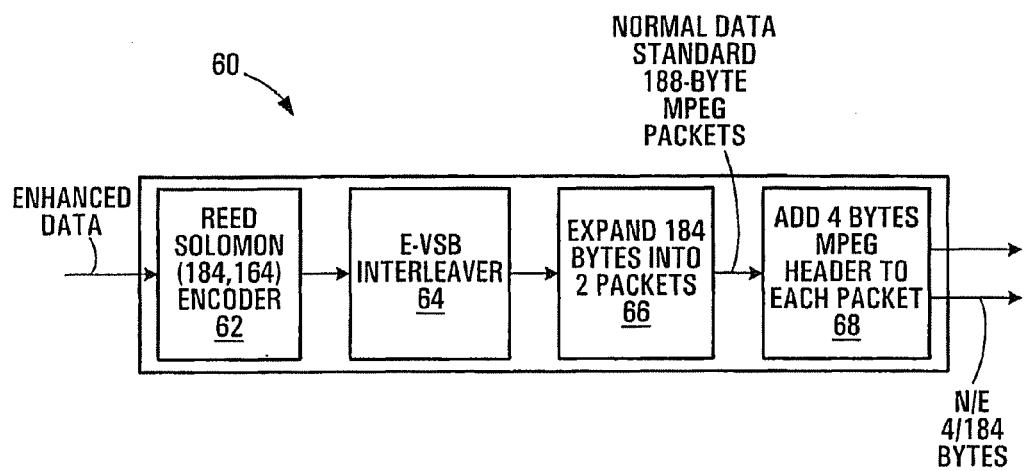
FIG. 3B is a simplified schematic block diagram of an enhanced data pre-processor of the transmitter of FIG. 3A.

Now, FIGS. 3A-3B illustrate an EVSB transmitter 40 capable of transmitting a multiplexed stream of conventional 8-VSB packets and robust packets. As illustrated in FIG. 3A, normal MPEG2 transport packets (labelled "normal data") and additional robust data are multiplexed by multiplexer 42. Multiplexed data is conditioned as described below, and provided to a standard VSB transmitter 10', identical to transmitter 10 detailed in FIG. 1.

FIG. 3B schematically illustrates a robust data pre-processor 60 that formats robust data as standard MPEG2 transport packets. That is, in order to facilitate compatibility with a conventional VSB receiver, EVSB data is encapsulated in standard MPEG2 transport packets. So, pre-processor 60 receives data to be robustly encoded. This data is referred to as robust data. The robust data is divided in groups of 164-byte blocks. Each 164-byte block is ultimately converted into two MPEG2 packets. As illustrated, pre-processor 60 includes an R/S encoder 62 that adds 20 bytes of R/S parity to each 164 byte block of payload EVSB data, to form (184,164) Reed Solomon blocks. The generator polynomial for the R/S encoder 62 is the same as that used in the R/S code (207,187) 8-VSB R/S encoder 14 of FIG. 1. The output of the R/S encoder feeds a robust convolutional interleaver 64 that interleaves robust bytes.

184-byte interleaved data block are mapped into two 184-byte packets by block 66. Every byte in each 184 byte block is split into two groups of four bits: A,B,C,D and E,F,G,H. Two new bytes are generated by interspersing zeros as follows A, 0, B, 0, C, 0, D, 0, and E, 0, F, 0, G, 0, H, 0. Thus, each byte is mapped into two bytes halving the data rate. Each 184 bytes output from the R/S encoder 62 is thus expanded into two 184-byte packets by block 66. A 4-byte MPEG NULL packet header is pre-attached to create a compliant MPEG2 transport stream packet at block 68. As will be appreciated, conventional VSB receivers ignore MPEG2 NULL packets, effectively discarding these and only processing packets without the NULL packet header, thus allowing backward-compatibility with convention VSB receivers.

At an EVSB receiver, data in two adjacent robust packets generated by block 68 may be consecutively re-assembled. An EVSB receiver may merge these two packets into one. Then, those packets may be de-interleaved. The resulting 184-byte data block may be Reed-Solomon decoded to regenerate the 164 bytes of robust data. Those 164-byte packets will be reassembled into 188 MPEG II packets.

As noted, robust packets and normal MPEG2 transport packets are multiplexed by multiplexer 42 of transmitter 40, illustrated in FIG. 3A. The multiplexed packets are now randomized, R/S encoded and byte interleaved by randomizer 44, R/S encoder 46, and interleaver 48, respectively, in a manner identical to that performed by randomizer 12, R/S encoder 14 and interleaver 16 of a standard transmitter 10. Bytes exiting data byte interleaver 48 will consist of interleaved bytes from normal and robust packets. Along with each byte, side information is carried indicating whether the byte is normal or robust. This is depicted as the N/R (Normal=0/Robust=1) flag.

Figure 4A:
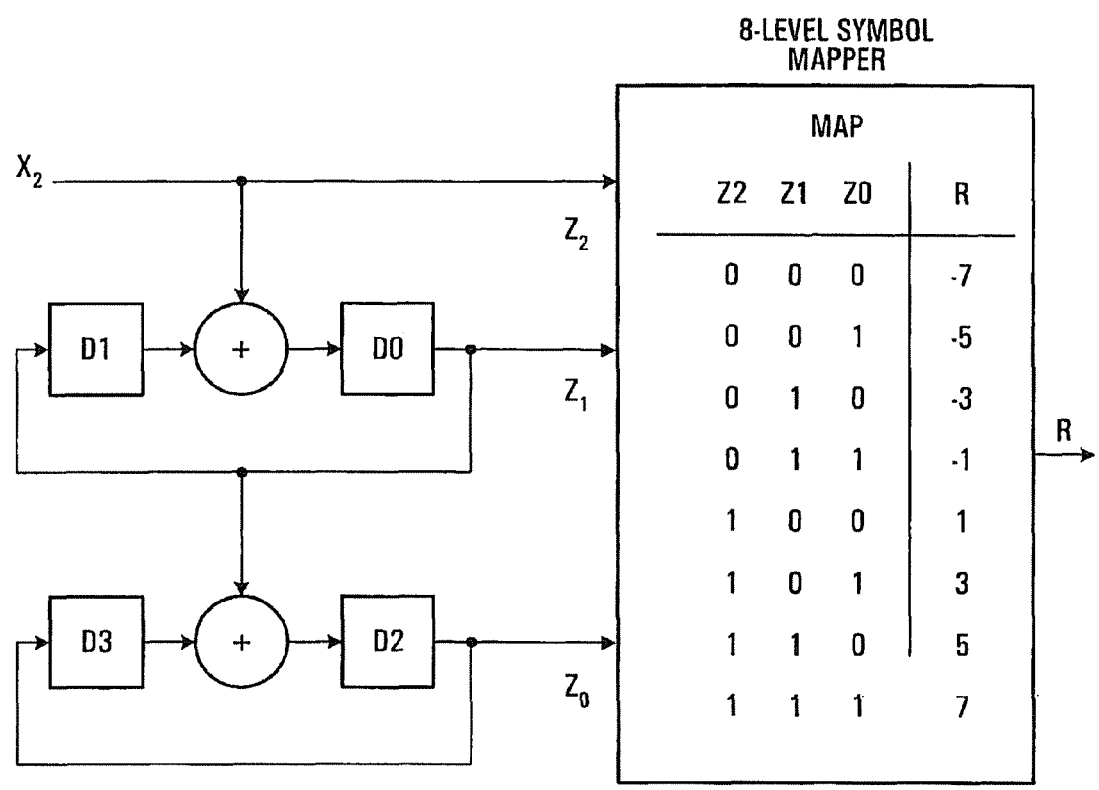
FIG. 4A is a simplified schematic block diagram of a trellis coder for robust data (non-inverted phase equivalence)
Figure 4B:
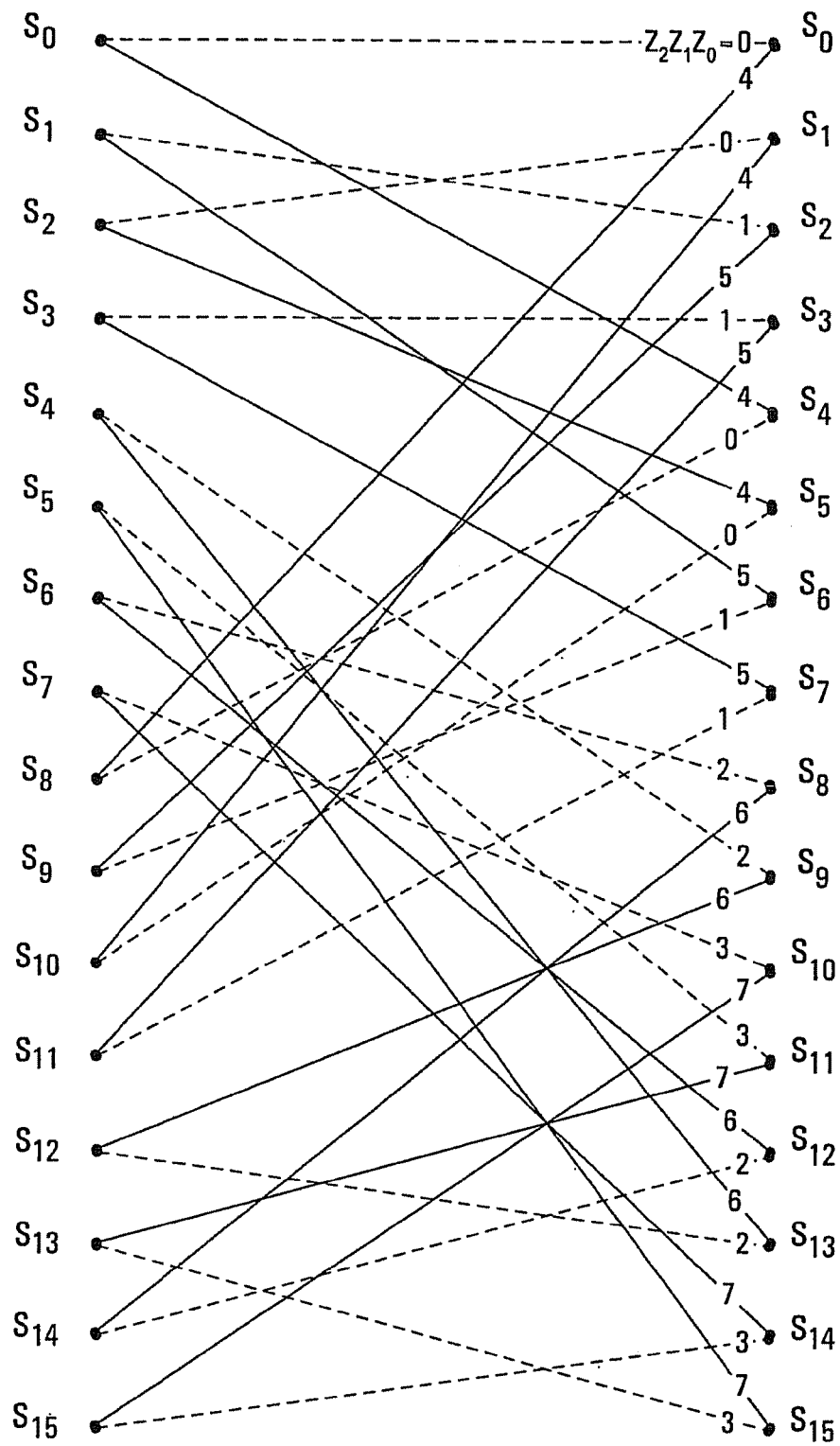
FIG. 4B is a trellis state transition diagram (non-inverted phase equivalence) for the trellis code used by the encoder of FIG. 4A.
Figure 4C:
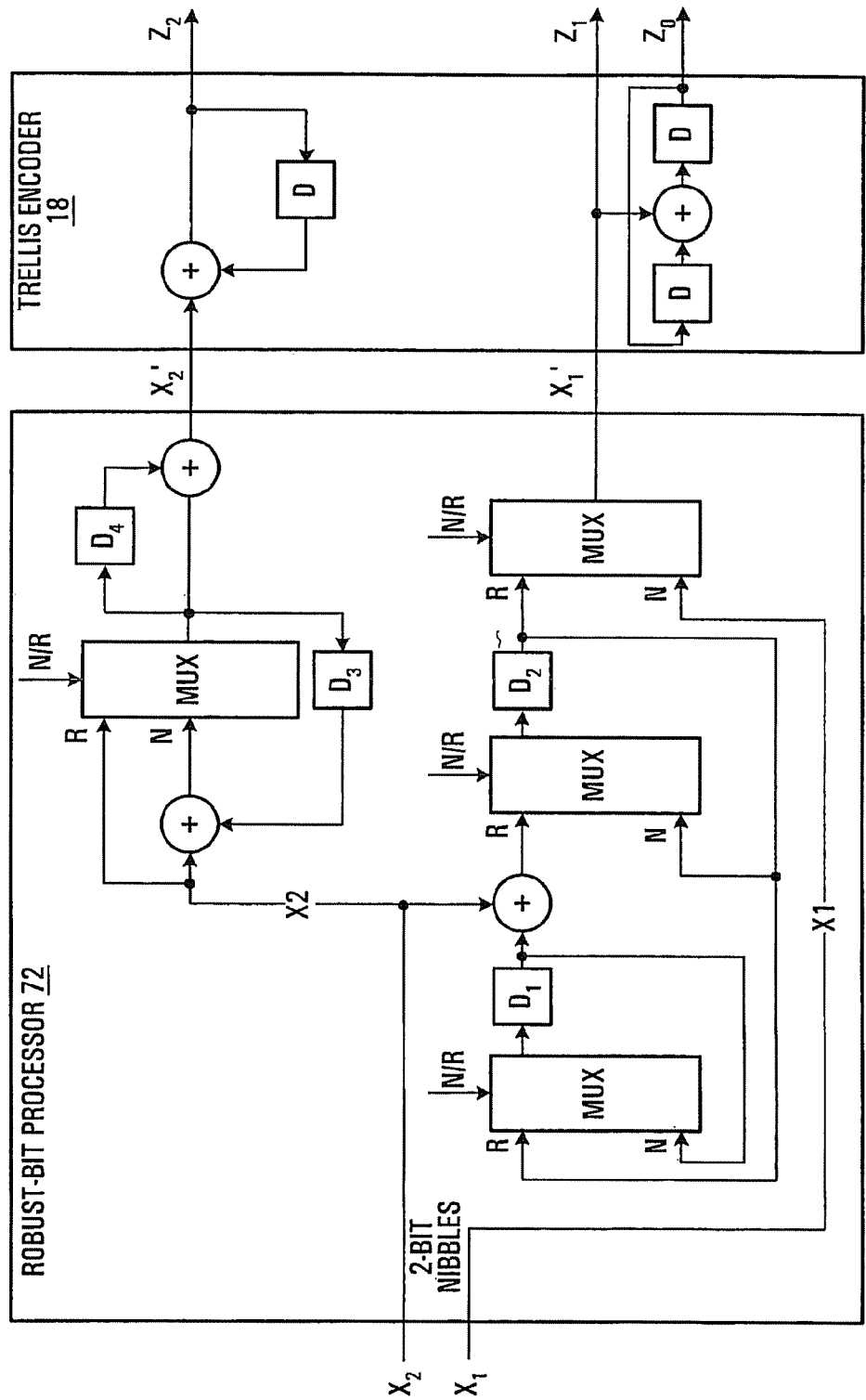
FIG. 4C is a simplified schematic block diagram of a convolutional pre-coder and trellis coder of the EVSB transmitter of FIG. 3A.

All two bit nibbles (whether corresponding to normal bytes or robust bytes) are processed with a robust bit processor 72. Robust bit processor includes 12 identical processors. For normal bytes, robust bit processor 72 is a pass through (as will be explained with reference to FIG. 4C, below). Therefore normal bytes at the output of block 54 are identical to normal bytes at the input of multiplexer 42. For robust bytes, robust bit processor 72 acts as 12 systematic ½ convolutional coders encoding each bit A,B,C,D or E,F,G,H into two bits. The zero bits interspersed between the data A, B,C,D or E,F,G,H are replaced with the parity bit A',B',C',D' or E',F',G',H'. For robust bytes the concatenation of robust bit processor 72 and the trellis encoder 18 leads to an effective ⅓ trellis encoder as illustrated in FIG. 4A (or FIG. 4D, as explained below) Each one of the twelve robust bit processors works with one of the twelve trellis encoders 18. The twelve processors are arranged in much the same way as the twelve trellis encoders 18, as depicted in FIG. 2C. The resulting trellis for the ⅓ code robust bytes is illustrated in FIGS. 4B and 4E.

Multiplexer 42 provides signals to data randomizer 44, byte interleaver 48 and robust bit processor 72 identifying a byte as belonging to a normal or robust packet (N/R). Robust bit processor 72 has two functions. The first is to add a layer of convolutional code to robust bytes. The second is to compensate for the pre-coder used in trellis coder 18 (feedback in the upper path of FIG. 2A), for robust bytes. A single one of the twelve robust bit processors 72 is therefore formed as illustrated in FIG. 4C. For robust bytes the compensation of the pre-coder is accomplished by using the pre-filter D4 in robust bit processor 72 to cancel the effect of the filter D5 in trellis coder 18. Depending on the initial states of D4 and D5 the output of trellis coder 18 will be either Z2=X2 or Z2=inv (X2) (where inv(1)=0 and inv(0)=1). For normal bytes the combination of the filters D3 and D4 result in having X2'=X2. For a data stream that combines normal and robust bytes, the robust bit processor 72 produces bits X1' and X2' that remain equal to the input bits X1 and X2 for normal bytes and produces bits X1' and X2' such that the final output of trellis encoder 18 Z2 equals either to X2 or the inverse of X2. However, random phase flips of bit X2 will occur if states D4 and D5 are not synchronized. This is lack of synchronization is caused by the presence of those normal bytes that are R/S parity of robust packet generated by R/S encoder 14 between robust bytes within the data stream.

The output of robust bit processor 72 is now de-interleaved. R/S blocks are stripped of R/S parity bytes, and de-randomized by de-interleaver 50, and blocks 52 and 54, to undo the effects of interleaver 48, R/S encoder 46 and randomizer 44. The resulting stream may now be provided to transmitter 10' which has the function of transmitter 10 of FIG. 1. Transmitter 10' now encodes bytes corresponding to normal MPEG2 packets in the stream in an entirely conventional manner. Pre-processed robust MPEG2 packets (including robust data) are similarly encoded. However, the combination of robust bit processor 72 and transmitter 10' causes robust MPEG2 packets to be robustly encoded in a manner equivalent to using a ⅓ trellis.

Figure 4D:
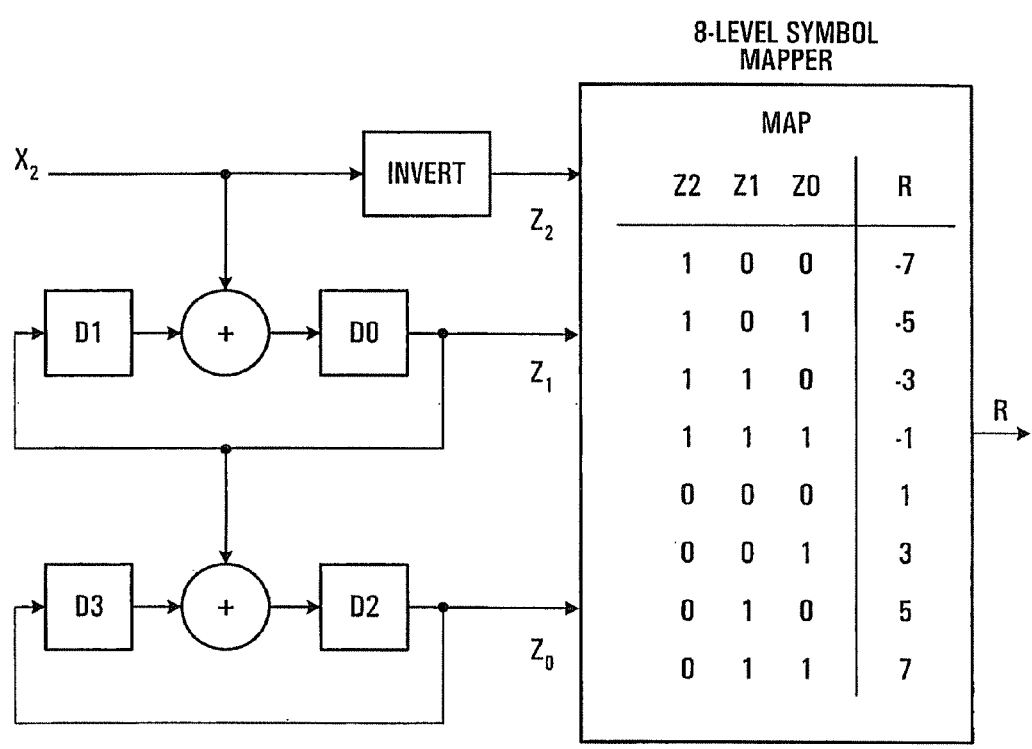
FIG. 4D is a simplified schematic block diagram (inverted phase equivalence) of a (inverted phase) trellis coder for robust data.
Figure 4E:
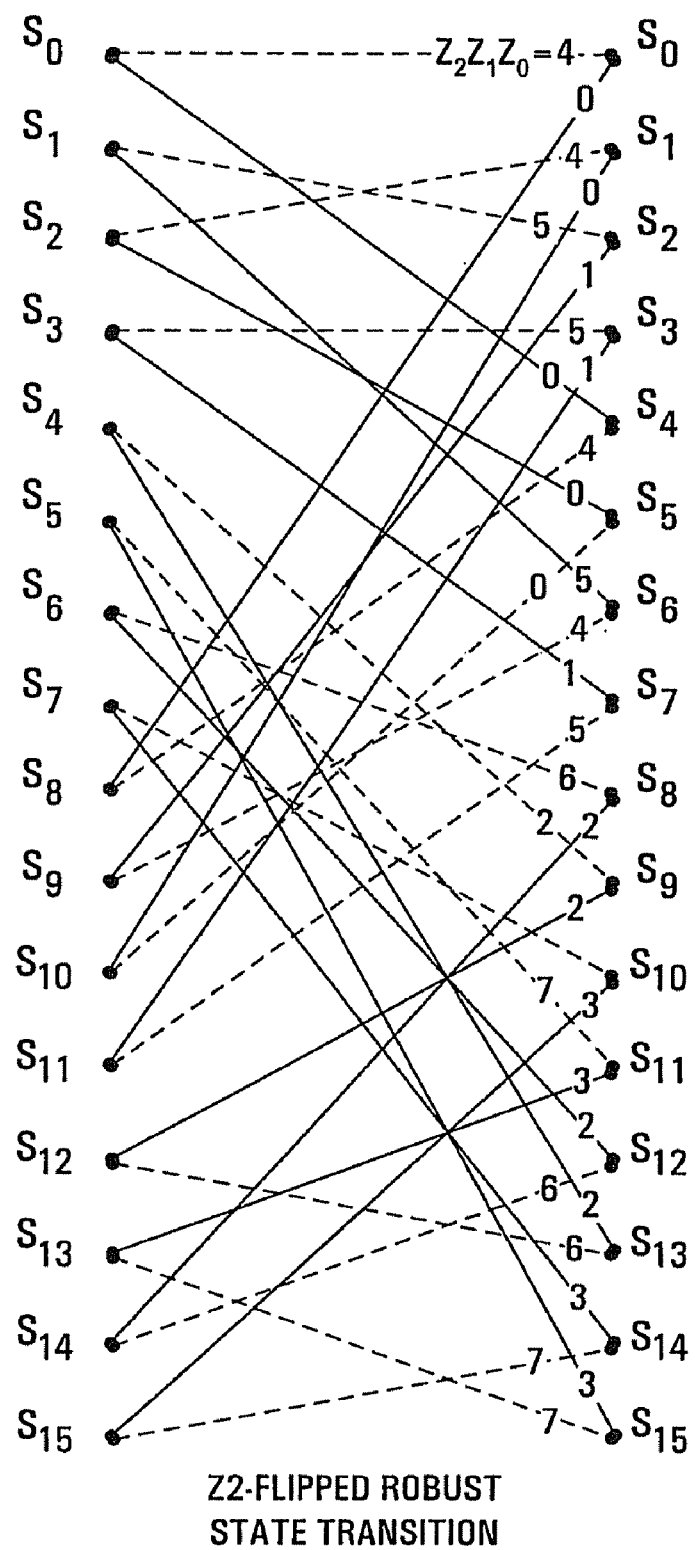
FIG. 4E is a state transition diagram (inverted phase equivalence) for the trellis coder of FIG. 4D.

That is, each bit of robust data, having been pre-processed by pre-processor 60 and coded by robust bit processor 72 and trellis coder 18 is encoded into a series of robust encoded symbols, with each three bit symbol containing only one bit of robust data, equivalent to the trellis coder of FIG. 4A (or FIG. 4D). As a result of data interleaver 16, normal and robust symbols are pseudo randomly mixed in groups of four, in the same data stream.

Notably, for normal packets, R/S encoder 14 and R/S encoder 46 calculate the same R/S parity bytes. For robust packets, however, R/S encoder 14 calculates R/S parity bytes for symbols pre-processed by robust bit processor 72. Those R/S parity bytes of robust packets cannot be pre-calculated at R/S encoder 46. Now, for robust symbols delay blocks D3 and D4 of robust bit processor 72 (see FIG. 4C) are required to store delayed versions of symbols provided to the inputs of encoder 18, in order to accurately calculate the convolutional code defined by the coder of FIG. 4A. For those robust packets' R/S parity bytes calculated by R/S encoder 14, the inputs to trellis coder 18 are unknown at robust bit processor 72. Thus, the states of D5 after trellis coder 18 transmit those R/S parity bytes are unknown, and may cause a phase-flip of the ⅓ robust trellis coder. In other words, after a phase-flip, the Z2 bit is inverted and the ⅓ trellis shown in FIG. 4E is followed. Such phase ambiguity may be resolved at the receiver.

Figure 5:
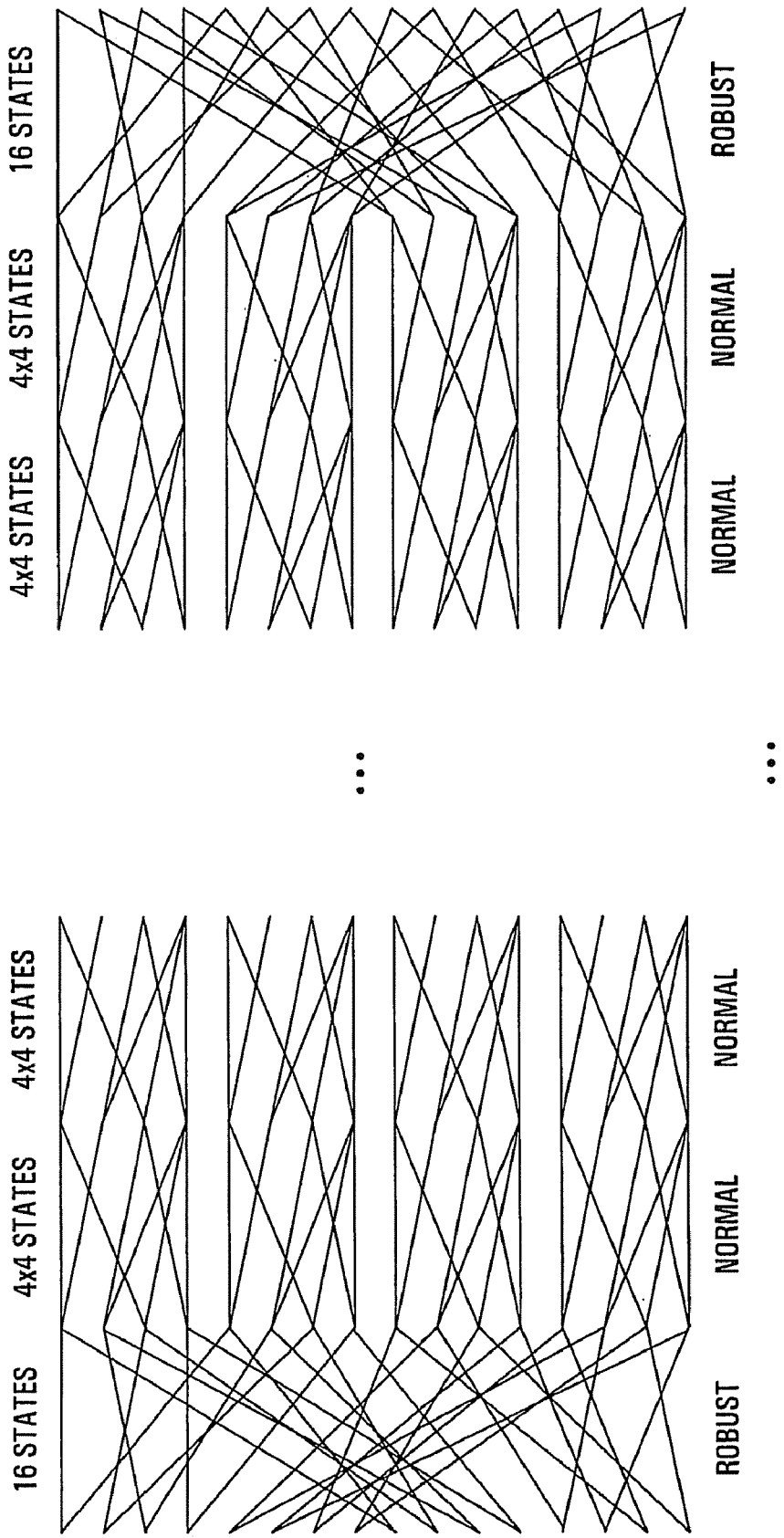
FIG. 5 is a trellis state transition diagram of a hybrid trellis code for normal and robust stream.

The resulting stream is decoded as symbols on a hybrid trellis. The state transition diagram for a stream along the hybrid trellis (including symbols corresponding to the trellis structure of FIG. 2B and FIG. 4B or FIG. 4E) is illustrated in FIG. 5.

Figure 6:
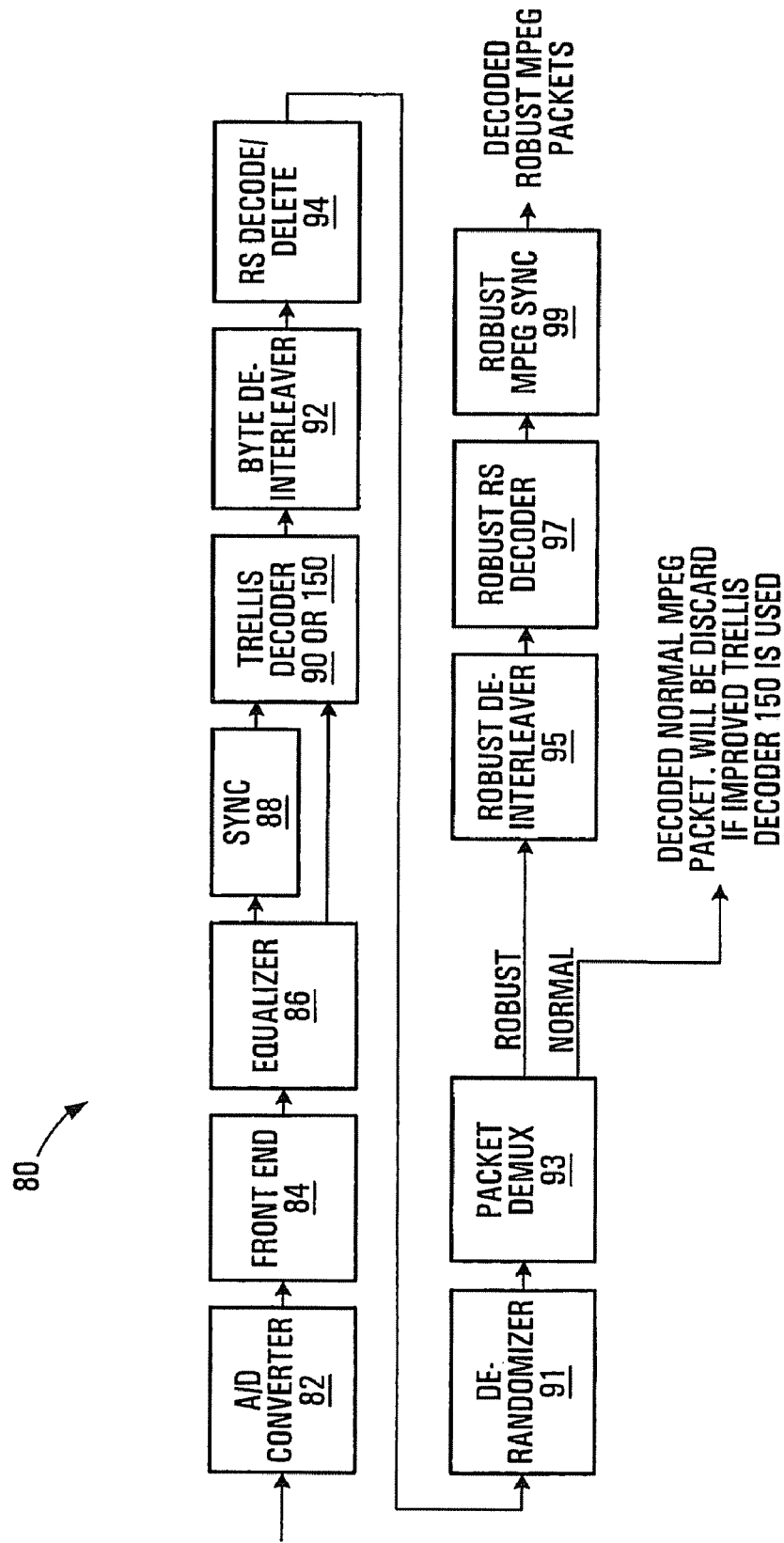
FIG. 6 is a schematic block diagram of an EVSB receiver.

A receiver 80 for decoding a stream including robust and normal symbols is illustrated in FIG. 6.

As illustrated, receiver 80 includes an analog to digital converter 82 a front end 84 and an equalizer 86, details of which will be apparent to a person of ordinary skill. Equalizer 86 provides demodulated symbols to a sync detector 88. Sync detector 88 detect the frame sync and the segment sync of each field and further for each field determines on a symbol by symbol basis if the symbol is robust or normal. This information defined as a N/R flag that is made available to the FEC. Additionally, sync detector 88 determines if a normal symbol is a RS parity symbol of the robust packet. This information is provided to trellis decoder 90/150. Output of equalizer 86 is provided to trellis decoder 90/150.

Figure 7A:
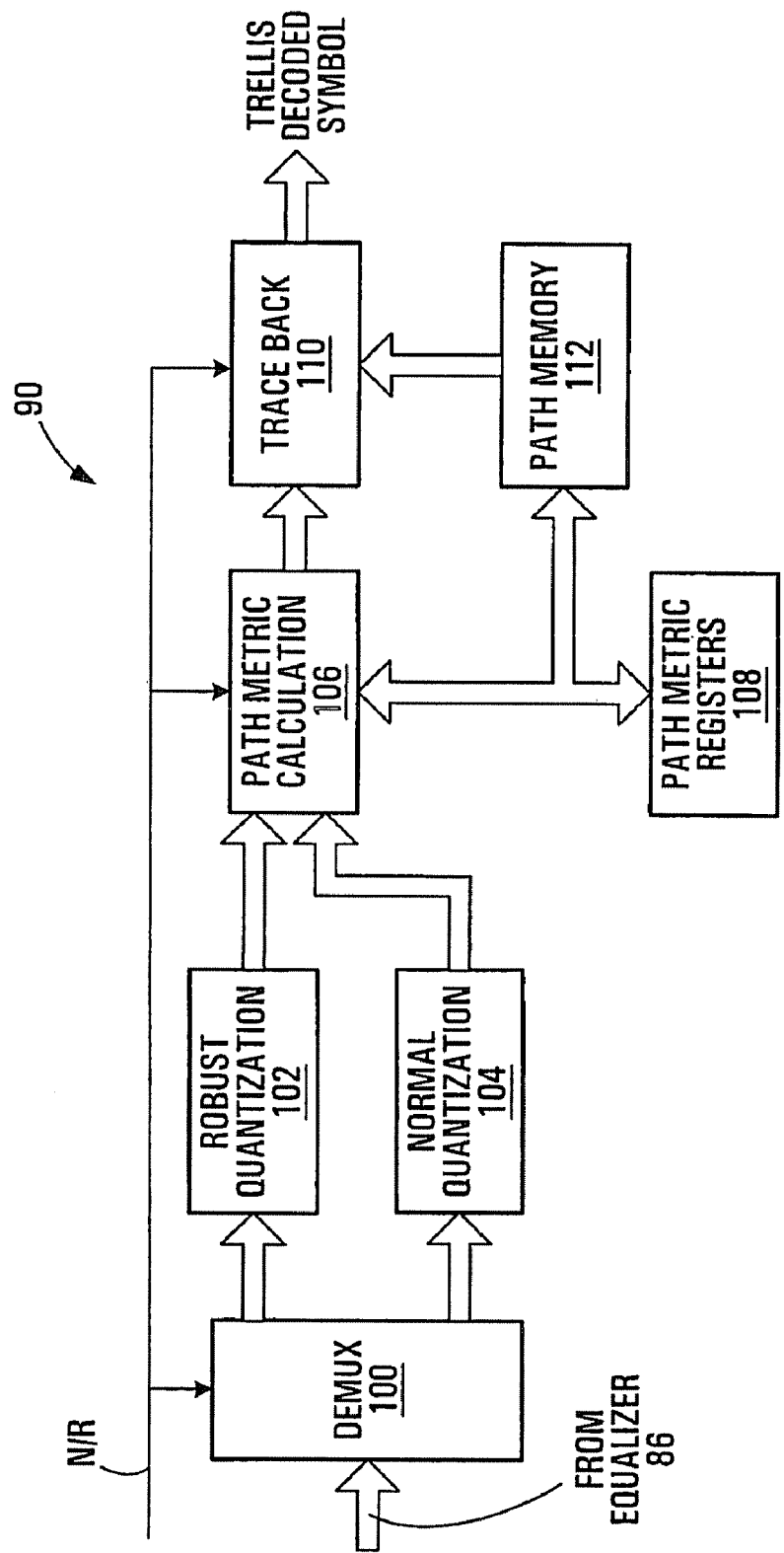
FIG. 7A is a schematic block diagram of a trellis decoder that may be used in the EVSB receiver of FIG. 6.

A modified conventional trellis decoder 90 capable of decoding normal and robust symbols received by receiver 80 is illustrated in FIG. 7A. A corresponding flow chart illustrated in FIG. 7B. Trellis decoder 90 uses a Viterbi decoding algorithm. Viterbi decoding is more particularly detailed in Lin, Shu & d. Costello, *Error Control Coding*, supra.

For each symbol, decoder 90 receives an estimate of the symbol transmitted (step S702, FIG. 7B) at demultiplexer 100. As well, an indicator of whether an arriving is symbol is a normal or robust symbol is provided to demultiplexer 100 by sync detector 88. Demultiplexer 100 provides robust signals to robust quantization block 102, and normal symbols to normal quantization block 104. Each quantization block 102 and 104 outputs a signal representative of the distance to allowable symbols in the VSB constellation.

For each normal symbol, quantization block 102 compares the received symbol estimate compared to all allowable symbol in the VSB signal set (step S706), and a distance to allowable signals is calculated. These distances represent incremental errors for the received encoded symbol, when compared to all allowable symbols. As noted, for normal symbols, bit z2 is uncorrelated to z1, z0 (see FIG. 2A). So, for a z1z0 pair, the z1z0 with the least error to the received symbol level is identified, and the z2 bit for this result is stored, in order to decode X2 bit of the normal symbol. For ease of reference, each z1z0 pair is identified by symbols A[z1z0], X2=0 and B[z1z0], X2=1, in FIG. 2A. The square (or log likelihood) of the error of the received symbol to each allowable symbol is calculated by path metric block 106 and temporarily stored in step S708.

Now, a path metric for each path on the trellis is calculated in step S710 and stored in one of path metric registers 108. This is done by adding the incremental error for the next leg of each path, entering each state of the decoder. That is, the path error contributed by the new symbol to get to each state from previous states for all states along of the trellis is accumulated. As at least two paths enter each state, only the path with the smaller (minimum) incremental error is considered. As well, an indicator of the leg of the path associate is maintained in path memory 112.

As a result, the path metric stored in path metric registers 108 represents the cumulative path error along possible paths ending at each current state of the trellis decoder after receipt of the current symbol. The path metric is used to assess which of the possible paths results in the least cumulative error after receipt of the current symbol.

As the path metric registers 108 are only used to identify the least error path after receipt of a symbol, these registers may be normalized in step S710. This may for example, be accomplished by reducing the value of each path metric register by a value corresponding to the smallest valued register, as detailed below.

In any event, after the least error path's start point is identified, the first symbol along this path is decoded by tracing back calculator 110. In order to decode the first symbol, path memory 112 stores sufficient information to allow decoder 90 to trace back to the first symbol. Thus, the number of path metric registers 108 equals the number of allowable states of the trellis decoder. The size of path memory 112, on the other hand, is dependent on the number of symbols used for the trace back by calculator 110.

Figure 7B:
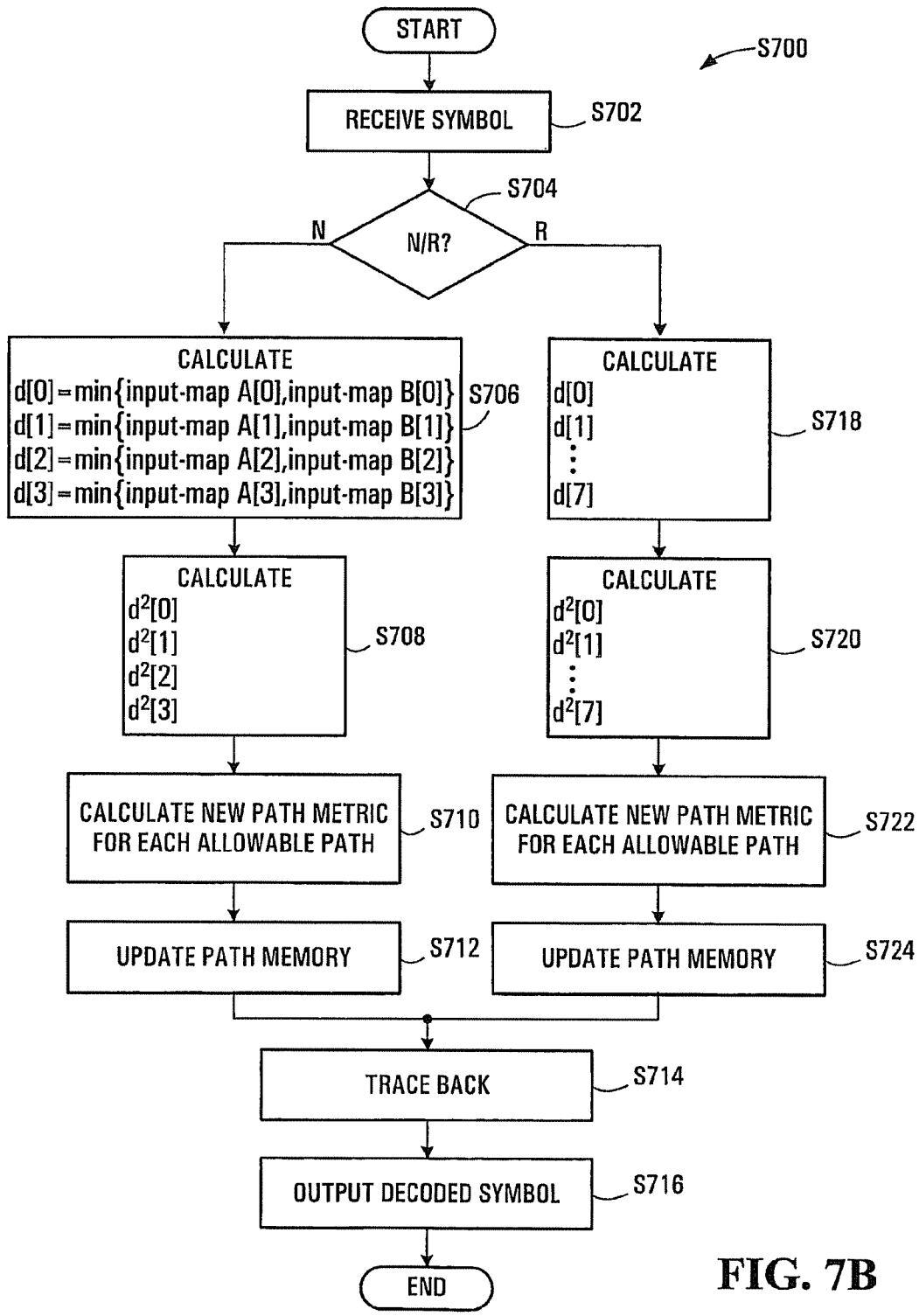
FIG. 7B is a flow chart illustrating steps performed by the trellis decoder of FIG. 7A.
Figure 7C:
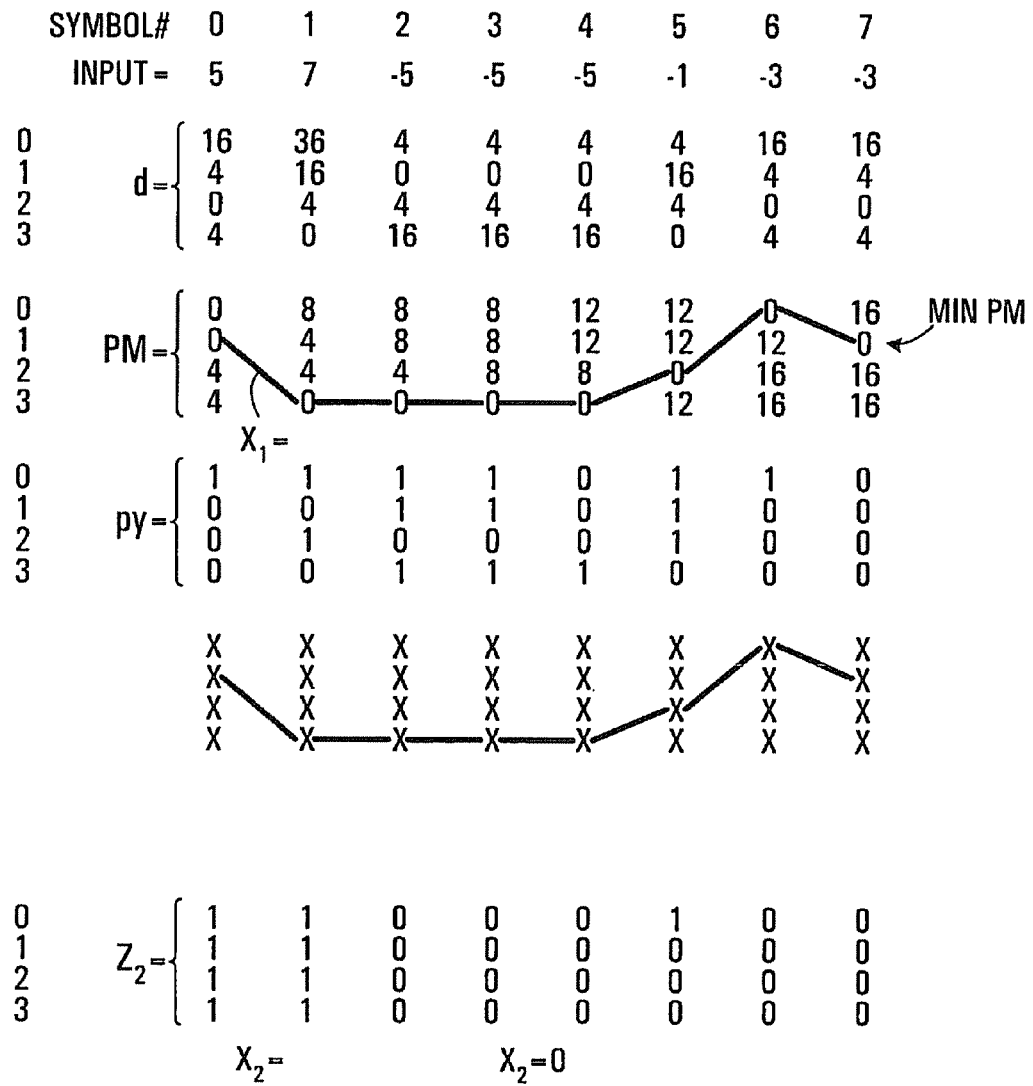

Calculation of the path metrics and paths for normal symbols may be best understood with reference to the example depicted in FIG. 7C. As illustrated symbols {5}, {7}, {−5}, {−5}, {−5}, {−1}, {−3} and {−3} are sequentially received. For the symbol #1 {5}, square errors to z1z0 pairs are calculated as 16, 4, 0, 4 (see the map and trellis diagram of FIGS. 2A and 2B). The incremental path error to each state from previously possible states is calculated as 0, 0, 4, 4 for all four possible current states (s0,s1,s2,s3). The shortest path leg is identified 1, 0, 0, 0 for the four states, with 1 representing the plain leg and 0 the dashed leg on the trellis. At the same time z2 is independently decoded for each possible z1z0 pair.

For the next symbol {7}, square errors of 36, 16, 4, 0 to possible symbols to previous states are calculated (steps S706-S708—block 104) (i.e. min (14,6) for symbol z1z0=00; min (12,4) for symbol z1z0=01; min (10,2) for symbol z1z0=10; min (8,0) for symbol z1z0=11). Then, the minimum incremental square error along the path (from state 2) to state 0 is 4; the minimum incremental square error along the path (from state 1) to state 2 is 4; (from state 2) to state 3 is 0; (from state 1) to state 3 is 0. These are summed to the path metrics to the previous states (i.e. path metrics of states 2, 1, 2, 3=4, 0, 4, 0) (step S710). Again, the path legs are stored as 1, 0, 1, 1 for the four state transitions (step S712—path memory 112). Determined z2 is stored as 1, 1, 1, 1 for all four states (step S706—path memory 112).

Incremental path metric errors, path metrics, paths and z2 values are calculated for subsequently arriving symbols. In order to avoid overflow of the path metric registers for each state, they are normalized by deducting a value equal to the smallest stored path metric at each state in step S710.

Once the path memory 112 has stored enough legs along the path, the path with the least cumulative error (referred to as the maximum likelihood path) is identified in step S714. Trace back calculator 110 traces back along the path with the least cumulative error in step S714 starting along the leg having the least cumulative error, and moving along the identified legs of the path to output the first decoded symbol. This decoded symbol corresponds to the first received symbol.

The path memory 112 is updated by removing the candidate symbol corresponding to the decoded symbol and adding another symbol at the beginning of the path memory allowing for a fixed length of path memory 112. Upon arrival of the next symbol, path metrics are again updated and stored in path metric registers 108. Trace-back calculator 110 may again determine most likely path and output the first symbol along the path.

In the example of FIG. 7C the path metric after symbol {7} indicates that the best fit path is path 1. Trace back along path memory 112 indicates symbol 0 should be decoded as z2z1=01, with z2=1. The value of last output symbol's leg is the decoded x1 and x2=previous Z2 XOR z2.

Upon arrival of the next symbol steps S702-S716 are repeated, and the second received signal is decoded. Thus, decoder 90 introduces a delay equal to the number of transitions stored in the path memory for each received normal symbol.

For robust symbols, in the simplified case where the bit z2 does not suffer from a phase flip ambiguity, Viterbi decoding may be performed in the same way using the trellis of FIG. 4B in steps S718 to S724. However, as the z2, z1, and z0 are correlated to each other, z2 is not independently assessed. Instead, the distances of the input signal to signals representing all eight allowable symbols are calculated in steps S718 and S720. Thereafter the path metrics from sixteen allowable states to allowable adjacent states on the trellis are calculated, and updated in step S722. Again, the path memory 112 maintains the optimal path along the trellis.

Calculation of the path metric and paths for robust symbols may be understood with reference to the example depicted in FIG. 7D illustrating path metric calculations for sequentially received robust symbols {5, −1, −1, −3, 5, 3, −7 and −5}. For example, the symbol {5}, square errors or log likelihood errors to z2z1z0 pairs are calculated as 144, 100, 64, 36, 16, 4, 0, 4. The path metric to each state from previously possible states is calculated as 64, 180, 84, 184, 0, 116, 120, 220, 212, 208, 120, 152, 100, 80, 228, 216 for all sixteen possible current states (s0, s1, s2, s15). The shortest path leg is identified 0, 1, 1, 1, 1, 1, 1, 1, 0, 0, 1, 1, 1, 1, 1, 0 for each state. Decoding of the first symbol may be produced after receipt of the last symbol, along a maximum likelihood path as illustrated in FIG. 7D.

For mixed normal and robust symbols, the symbol distances and path metrics may be calculated and updated as illustrated in FIG. 7C for normal symbols, and FIG. 7D for robust symbols, as depicted in FIG. 7B. Maintenance of an indicator of an arrived symbol as robust or normal may be used in determining how the path metrics and errors are calculated, as well as which of the two trellises should be used in calculating the trace back by calculator 110. This indicator may be stored in path memory 112, along with each leg along the path (e.g., 1 or 0, respectively). During the transition from robust to normal symbols the number of states for the normal symbols is limited to four groups of four states. Thus, each state of the sixteen state decoder transitions to one of four adjacent states, as the result of a normal symbol as best illustrated in FIG. 5.

The depicted decoder of FIG. 7A does not specifically resolve any phase ambiguity introduced by processor 72. As will become apparent, any phase ambiguity can be resolved by using another trellis decoder using a phase-inverted trellis. A comparison of the minimum path metric for each robust symbol generated by the normal and phase-inverted trellis decoder may determine the right phase of symbol.

However, although normal symbols and robust symbols may be mapped to a hybrid trellis, normal symbols do not assist in trellis decoding to the same extent that robust symbols do. Robust symbols are potentially interspersed between a large number of normal symbols at low robust/normal mix rate. As the memory size of path memory 112 is limited by hardware, the number of robust symbols in the memory varies based on robust/normal symbol mix rate. At lower SNR the normal symbols in the path memory may not help decoding robust symbols, as the normal symbols themselves cannot be decoded. Nevertheless, the path history of normal symbols occupies the memory space for decoding robust symbols. As a result, such a trellis decoder 90 cannot optimally decode robust symbols.

Exemplary of embodiments of the present invention, a new trellis decoding method for decoding a stream of interleaved normal and robust symbols increases the number of robust symbols used for assessing a maximum likelihood path along the trellis, without increasing the memory size.

Figure 8A:
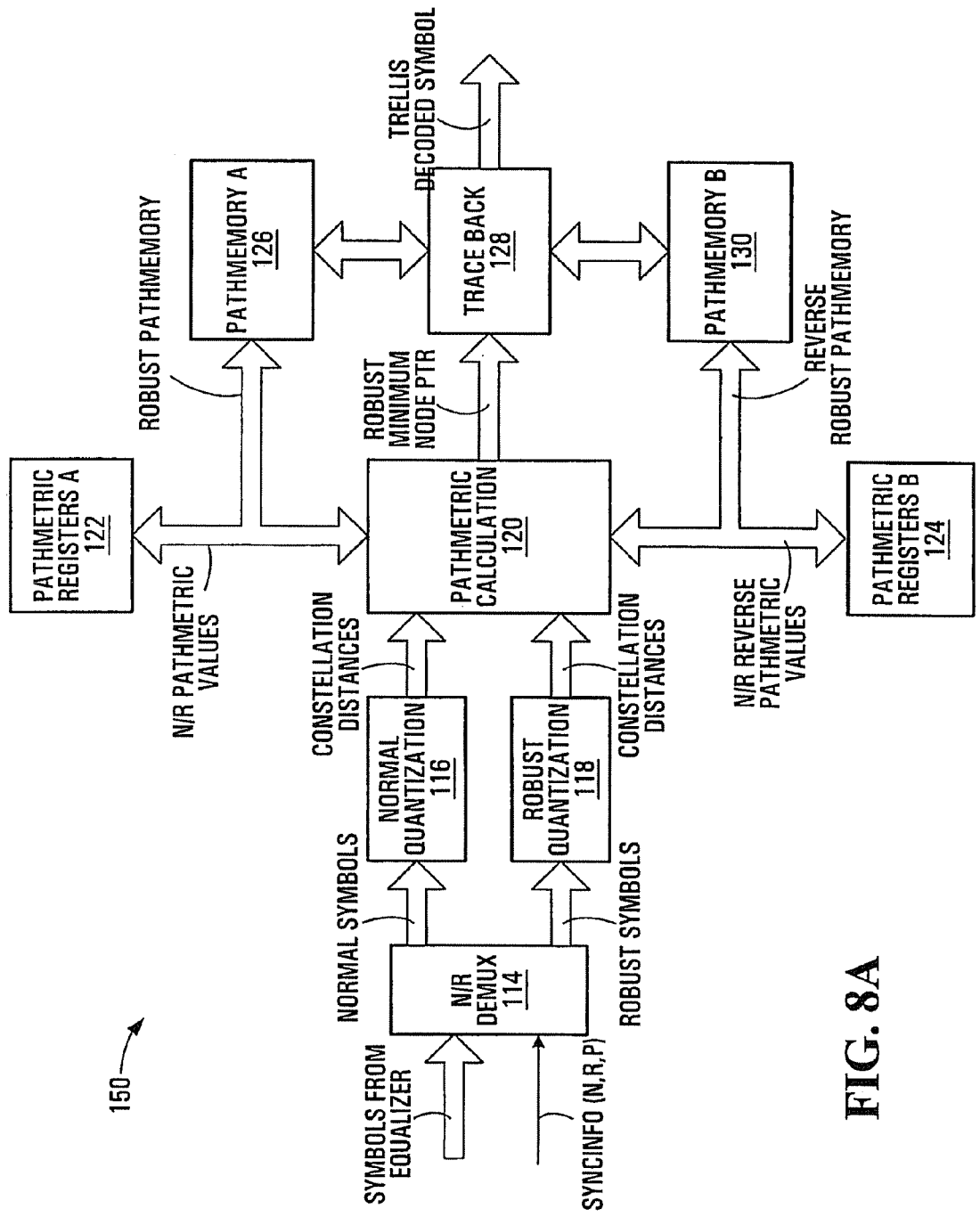
FIG. 8A is a simplified schematic block diagram of a trellis decoder that may be used in the of the EVSB receiver of FIG. 6, exemplary of an embodiment of the present invention.
Figure 8B:
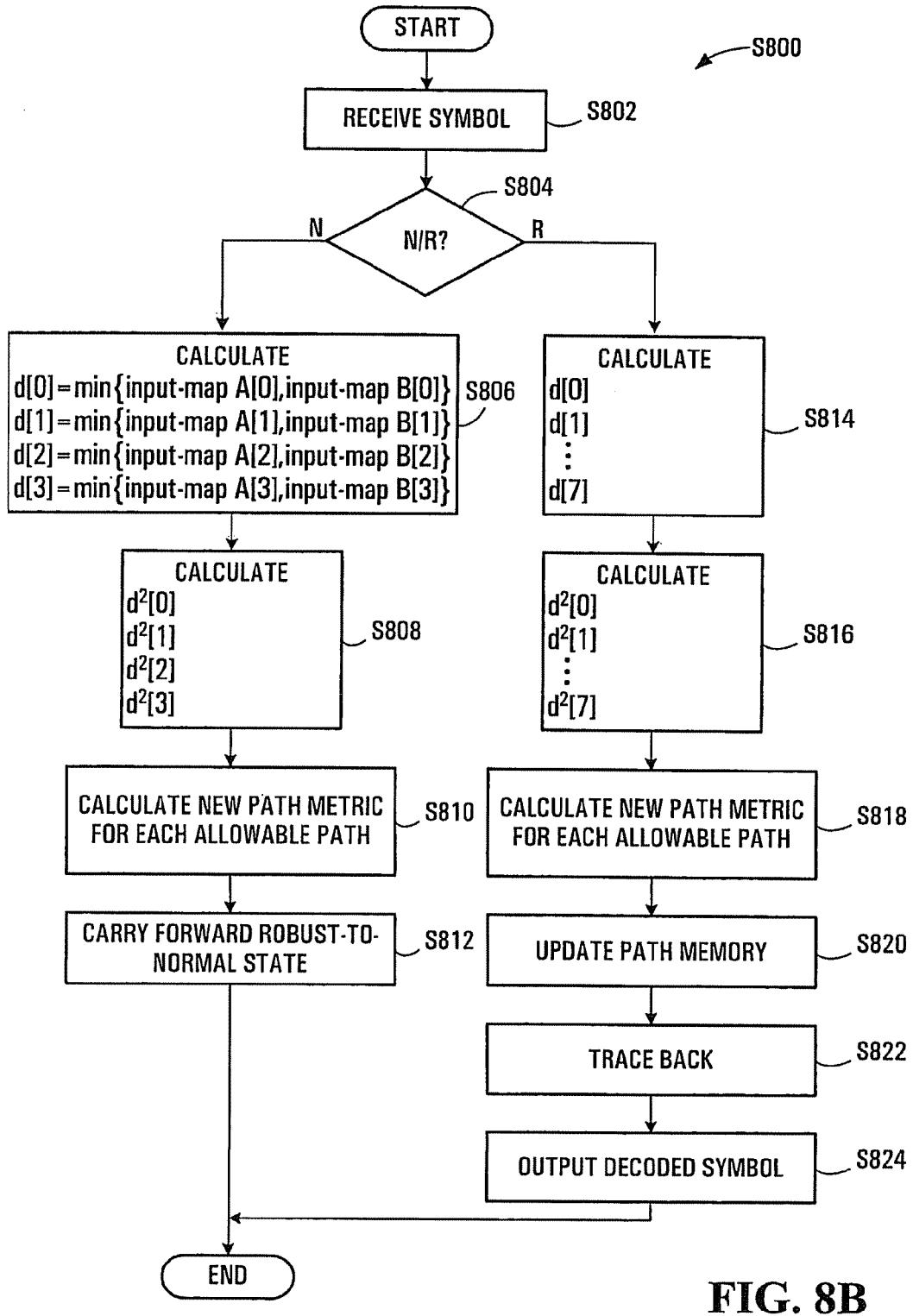
FIG. 8B is a flow chart illustrating steps performed by the trellis decoder of FIG. 8A.

Moreover, the decoding method further decodes streams of Normal/Robust symbols including a potential phase ambiguity that is introduced in the transmitted symbols. To resolve the phase ambiguity two trellises may be used in parallel. FIG. 8A accordingly illustrates an improved trellis decoder 150 for use in receiver 80. Steps S800 performed by trellis decoder 150 are illustrated in FIG. 8B. As illustrated, trellis decoder 150 includes a demultiplexer 114; two quantizers—a quantizer for normal symbols 116 and a quantizer for robust symbols 118; a path metric calculator 120, two path metric registers (path metric register A 122 and path metric registers B 124); two path memories (path memory A 126 and path memory B 130); and a trace back calculator 128.

For each symbol, decoder 150 receives a level corresponding to the symbol (step S802, FIG. 8B) and an indicator of whether or not the symbol is a normal or robust symbol at demultiplexer 114. Normal symbols are provided to normal quantization block 116; robust symbols are provided to robust quantization block 118. Each quantization block 116 and 118 calculates a distance metric of the received symbols to allowable symbols in the normal VSB (step S806-S808) and enhanced VSB signal constellation (step S814-S816), in the same way as blocks 102 and 104 perform these calculations in steps S706-S708 and S718-S720. Output distance metrics may reflect the (log) likelihood of the incremental error of the received signal for a leg of a path entering the current state of decoder 150. For each normal symbol four error metrics are output; for robust symbols eight error measures are output. Path metrics for normal and robust symbols are updated in steps S810 and S818 and stored in path metric registers A 122 in the same way as these are updated in step S710 and S712 and stored in registers 108 of FIG. 7A. However, path legs associated with robust symbols only are stored in path memory 126 in step S820.

It should be noticed that paths for normal symbols are not stored. As such, significantly less path memory may be used in decoder 150 than in decoder 90. Instead, upon receipt of a normal symbol, decoder 150 stores the previous state of the trellis decoder 150 corresponding to the last received robust symbols for all of the sixteen possible states along the path. This state may be viewed as the transition state of the trellis decoder 150 for each of the sixteen states of the decoder, as trellis decoder 150 begins to receive normal symbols after receiving robust symbols. The state transition for normal symbols will belong to one the four groups of states defined above. For each subsequent normal symbol, the last robust symbol state from which a normal symbol originated is carried forward (referred to as a "robust-to-normal state").

Figure 8C:
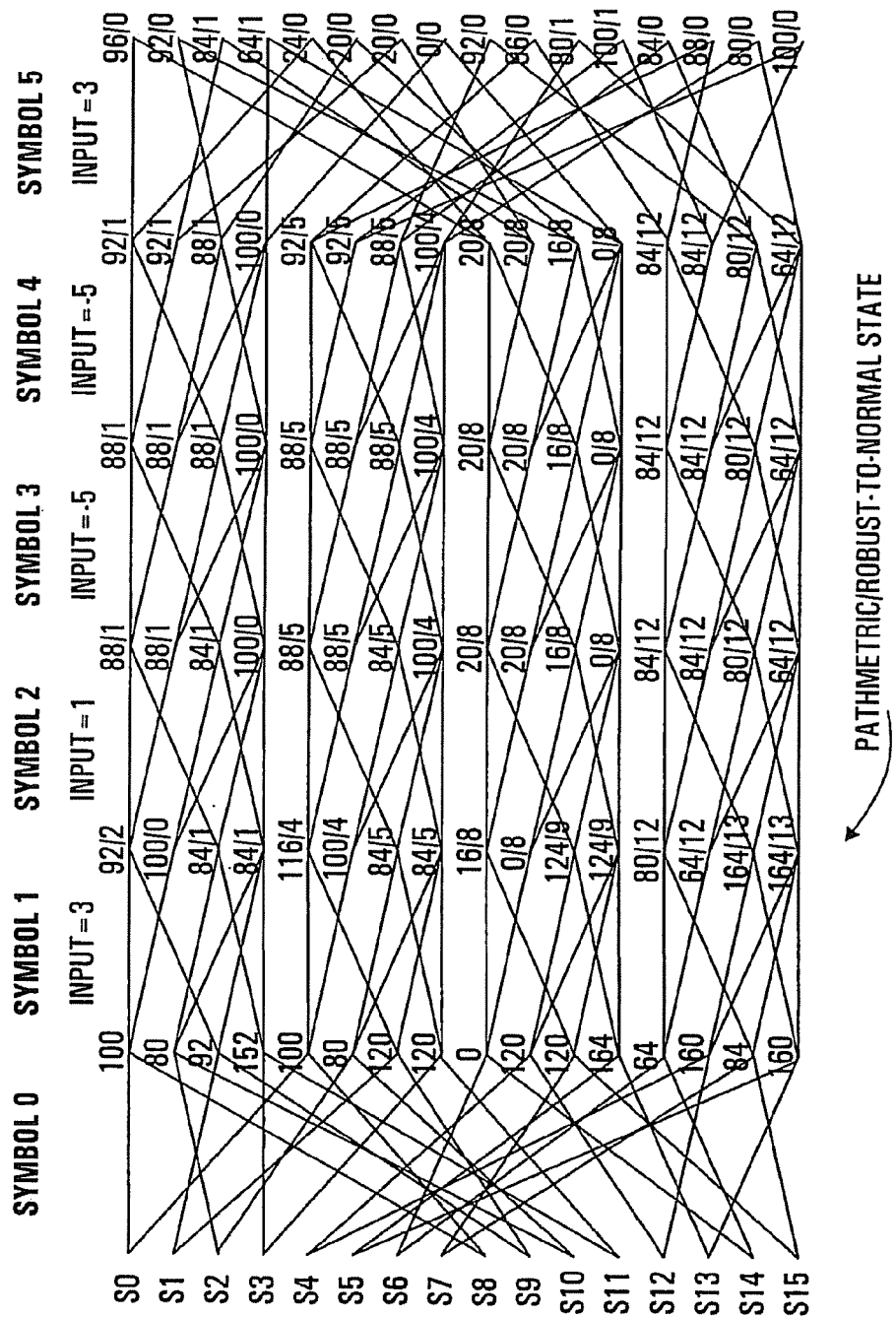
FIG. 8C depicts example decoding performed by the trellis decoder of FIG. 8A; Assume no phase flip happen between symbol 0 and symbol 5.

Decoding of robust symbols in a mixed robust and normal symbol stream, as described may best be appreciated with reference to FIG. 8C. Upon the arrival of symbol 1, a normal symbol following a robust symbol, the previous symbol's (symbol 0) path legs for sixteen states of the trellis decoder (i.e. the robust-normal transition states) for each previously received robust symbol are saved in path memory A 126. Path metrics are calculated in the conventional way. In FIG. 8C, path metrics and robust-to-normal link states are identified as pathmetric/robust-to-normal link state for each path. For example, after received symbol 1, the path including state 0 is associated with a path metric of 92, and a robust-to-normal transition state of 2. For subsequent normal symbols, the saved robust-to-normal link state of the trellis decoder 150 for the previous robust symbol is carried forward. Thus for each normal symbol, both the path metric and the previous robust-to-normal state of the trellis decoder 150 are saved in path metric registers 122 and path memory A 126. Conveniently, only one robust-to-normal state need be stored along each path. In the example of FIG. 8C, the state of trellis decoder 150 for the previous robust symbol 0 is saved for each symbol 1-4. The actual path between normal symbols need not be saved. Once sufficient robust symbols are stored within path memory A 126, the least error path may be assessed and trace back calculator 128 may use the path memory, and the robust-to-normal link states stored in memory A 126. Thus, in the depicted example of FIG. 8C, after symbol 6 is received, the path associated with path metric 6 is identified as the least error path. Trace back calculator 128 uses stored state 0, to trace back to, and decode, robust symbol 0 without tracing the path of normal symbols 1, 2, 3 or 4. Conveniently, only sixteen weak link states need to be stored in order to trace back over a group of adjacent normal symbols.

As detailed above, the ⅓ trellis coder formed from robust bit processor 72 and ⅔ trellis coder 18, at transmitter 40 may unpredictably transition from the trellis depicted in FIG. 4B to that depicted in FIG. 4D for robust symbols. Such transitions occur when symbols from R/S parity bytes of robust packets present. So, decoder 150 performs steps S818 and S820 for both normal and phase-inverted robust trellises as each symbol is received. Path metrics and paths calculated along one trellis (e.g. the "normal" trellis depicted in FIG. 4B) are stored in path metric registers A 122, and path memory A 126; path metrics and paths calculated using the other trellis (e.g. the "phase-inverted" trellis depicted in FIG. 4D) are stored in path metric registers B 124, and path memory B 130. Normal-to-robust states are similarly stored in memory A 126 and memory B 130 for each of the trellises. That is, {path metric (PM), path memory (py) and robust-to-normal states}$_A$ {PM, py and robust-to-normal states}$_B$ are stored. Path metrics for each symbol may be normalized across the two sets of path metrics in step S822, so that the smallest value path metric for each symbol is subtracted from path metrics in both sets. Thus, for each symbol, one of the two sets of states may be chosen in order to trace back to the first symbol along the path. This is performed in step S822.

Figure 8D:
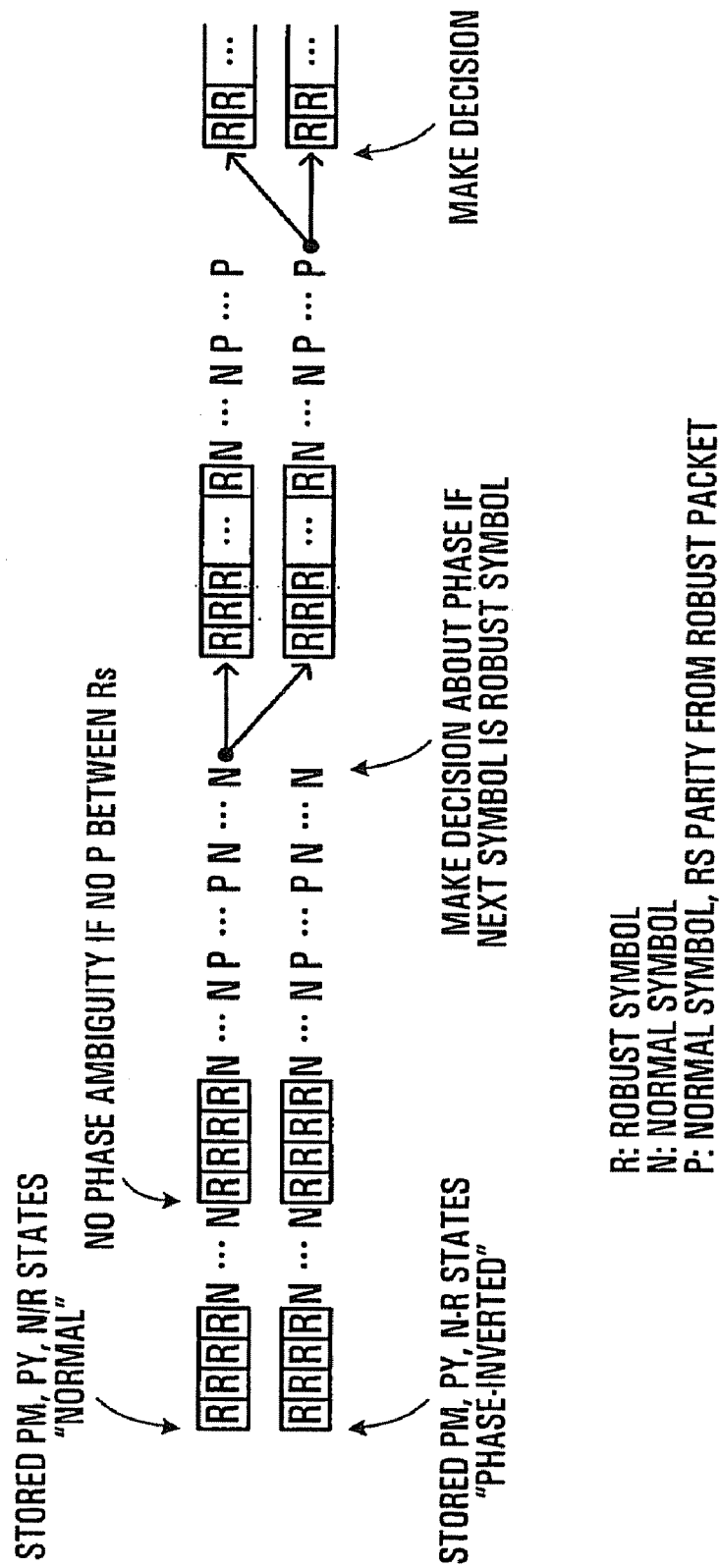
FIG. 8D schematically depicts the transition between two trellises in the decoder of FIG. 8A.

As well, the arrival of each encoded symbol that gives rise to a possible phase ambiguity (i.e. a R/S parity symbol for a robust packet) theoretically doubles the number of possible paths along the cumulative trellis. In order to limit the number of states stored, a decision is made upon the arrival of a series of robust R/S parity (one or more) to follow {PM, py and robust-to-normal states} from only one of the two previously stored sets of states. That is, {PM, py and robust-to-normal states}$_{A}$ {PM, py and robust-to-normal states}$_{B}$ having the lowest path metric is continued, with and without phase-inversion. This is schematically illustrated in FIG. 8D.

Decoder 90 (FIG. 7A) could similarly calculate path metrics and path memory along two separate trellises (i.e. normal and phase inverted), and could decide which of the two trellises should be used for decoding symbols in step S714. Again, the constructed trellises could switch between phase non-inverted and phase inverted trellis transitions each time R/S parity symbols for robust packets are present between robust symbols. A choice between trellises is made before the first robust symbol following a series of normal symbols, if robust R/S parity symbols present in those normal symbols. The chosen trellis is then used to calculate path metric for the next robust symbol, until robust R/S parity symbols are encountered.

Figure 9:
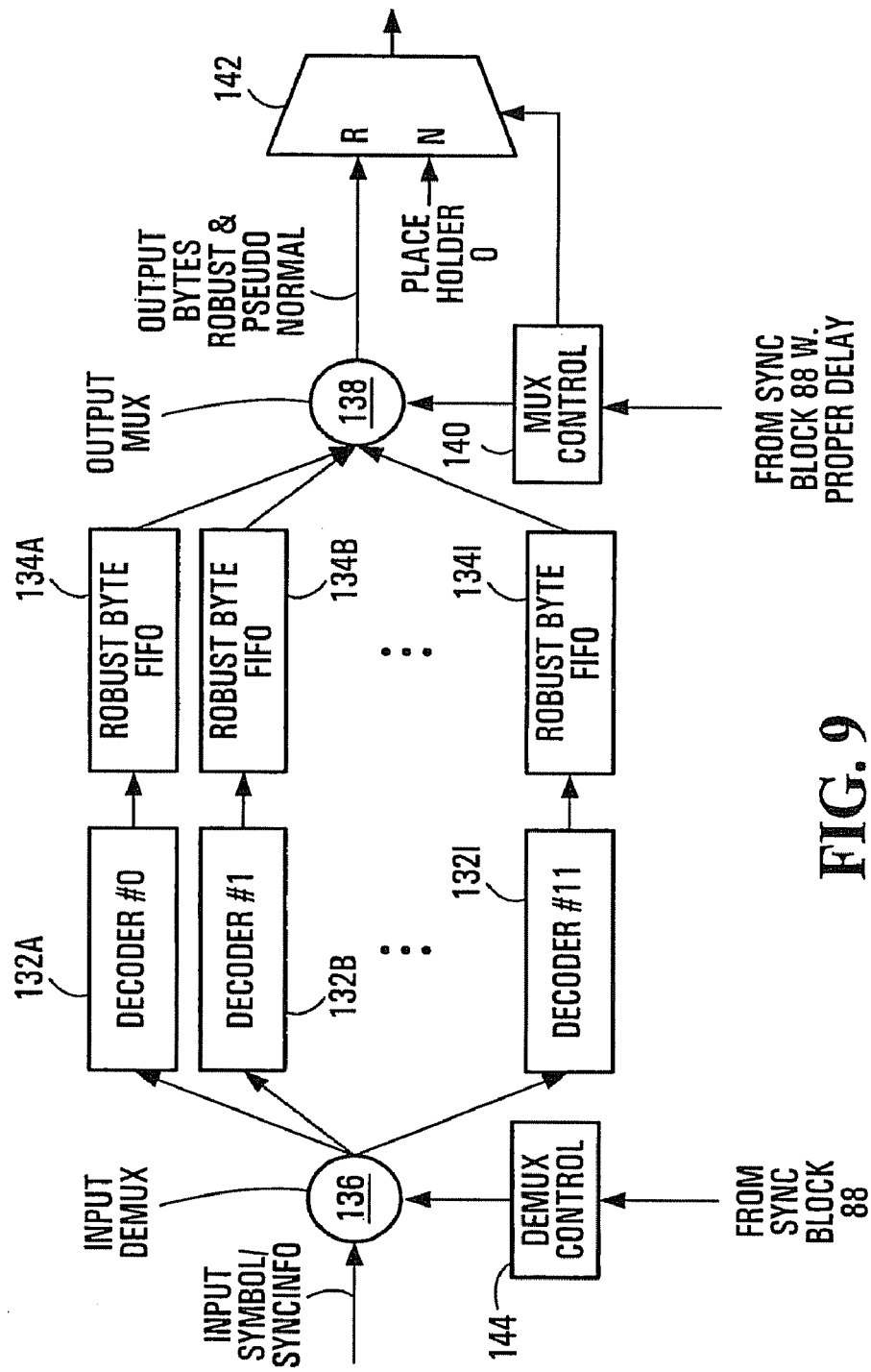
FIG. 9 is a block diagram illustrating multiple trellis decoders that that may be used in the of the EVSB receiver of FIG. 6, exemplary of an embodiment of the present invention.

Receiver 80 includes twelve (12) trellis decoders 132a-132l (each identical to decoder 90/150) arranged as depicted in FIG. 9. An input demultiplexer 136 like the one used in the non-enhanced ATSC trellis decoder, is used to demultiplex the trellis decoded stream. Decoders 132a-132l fill the fixed-length memory with the robust symbols and decode the robust bytes when the path memory is filled. Because the normal symbols are dropped, the output robust bytes of the 12 decoders become unsynchronized. To address this, 12 robust byte FIFO buffers 134a-134l are inserted. The length of the FIFO buffers' length can easily be estimated via simulation for a given mix rate of normal robust symbols per frame.

Within each decoder 132a-132l, the normal symbols' path memory is not stored. As trellis decoders 132a-132l are specifically designed for decoding robust symbols, no decoded bits are output for normal symbols from each decoder. Since data byte de-interleaver 92 of receiver 80 (FIG. 6) expects a stream of bytes including bytes in normal and robust packets, the output byte stream from the trellis decoder should include normal bytes (such as 0s) as placeholder symbols in order to have the byte de-interleaver 92 work properly.

One method of inserting place holder symbols (or bytes) is illustrated in FIG. 9. As illustrated, multiplexer control 140 is provided with an indicator of whether the decoded symbol is normal or robust (N/R), by receiving the output of sync block 88 after proper delay, reflecting any delay introduced by trellis decoders 132a-132l. Such delay can be achieved by using a FIFO buffer (or possibly a modified sync block 88). The length of the FIFO buffer will be equal to the total delay caused by trellis decoder 132a-132l's path memories. Output of trace back calculator 128 of each of the twelve trellis decoders 132a-132l is provided to a FIFO buffer 134a-134l. A second selector 138 is sequentially interconnected with the twelve FIFO buffers 134a-134l. Selector controller 140 is driven by sync detector 88 and sequentially advances from buffer to buffer 134a-134l and removes a decoded symbol, only when the stream of N/R indicator indicates the symbol to be output is a robust symbol. A decoded symbol is then removed from the interconnected FIFO, and passed by way of multiplexer 142 to byte de-interleaver 92. If the N/R output indicator of sync detector 88 identifies a symbol to be output as a normal symbol, selector 138 advances to the next buffer and no data is removed. At the same time, multiplexer 142 outputs a placeholder symbol and provides it to de-interleaver 92. De-interleaver 92 is thus provided with a series of decoded symbols for which each decoded robust symbol corresponds to 4 robust symbols originating with a transmitter, and each zero byte in the place of 4 normal symbols originating with the transmitter.

Alternatively, each decoder 132a-132l may use a counter to generate a count, counting how many normal symbols are between two robust symbols at the input of each decoder. The numbers are for example saved in the path memory associated with the robust symbols. These numbers are associated with the robust symbols throughout the trellis until they reach the output of trellis. At the output of trellis, the trellis output multiplexer 138 checks the output robust byte, if its associated count of normal symbols is not 0, it will output 0s as pseudo normal bytes. The number of place holder bytes corresponds to the normal byte/symbol count (4 normal symbols equal to 1 normal byte). This method may be easily implemented, however, extra storage is required to save the normal counts.

In any event, the output from trellis decoder 90 or 150 will be processed by byte de-interleaver 92. R/S decoder 94, and de-randomizer 91 illustrated in FIG. 6. A demultiplexer 93 outputs the decoded normal MPEG packets. Normal MPEG packets will contain all 0s if trellis decoder 150 is used, and may therefore be discarded. Robust packets are provided to robust packet de-interleaver 95 and R/S decoder 97. MPEG sync information is decoded and 188-byte MPEG packets are re-assembled from decoded 164-byte robust packets at block 99.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of trellis decoding a symbol stream comprising symbols of a first type and symbols of a second type, symbols of the first type are encoded using a first convolutional code and symbols of the second type are encoded using a second convolutional code, the method comprising:
for symbols of the first type, storing a plurality of states along each path of a trellis based on a comparison of incremental error metrics and storing an additional plurality of states along each path of a phase inverted trellis;
for symbols of the second type, storing a plurality of path indicators along each path of the trellis and storing an additional plurality of path indicators along each path of the phase inverted trellis, wherein path indicators are associated with each leg of each path; and
tracing back along a candidate path to decode a symbol according to the plurality of states, the plurality of path indicators, the additional plurality of states and the additional plurality of path indicators.

2. The method of claim 1, comprising choosing the symbol according to the plurality of additional states and the plurality of additional path indicators or the plurality of states and the plurality of path indicators.

3. The method of claim 2, wherein choosing comprises:
finding a first maximum likelihood path for a portion of the symbol stream along a first trellis;
finding a second maximum likelihood path for the portion of the symbol stream along a second trellis.

4. The method of claim 3, comprising decoding the symbol using the first maximum likelihood path if the first maximum likelihood path has less error than the second maximum likelihood path.

5. A trellis decoder for decoding symbols in a symbol stream comprising symbols of a first type and symbols of a second type, the symbols of the first type are encoded using a first convolutional code and the symbols of the second type are encoded using a second convolutional code, the trellis decoder comprising:
a path metric calculator operable to calculate an incremental error metric for legs of at least two arriving paths for each state of the trellis decoder and operable to calculate a minimum incremental error metric for the at least two arriving paths for each state;
a path memory operable to store a path indicator of each leg of each path associated with the minimum incremental error for states along a trellis for arriving symbols of the second type,
the path memory operable to store states along each path of the trellis for arriving symbols of the first type that arrive immediately prior to symbols of the second type;
a path trace-back calculator operable to decode a symbol of the second type according to the path indicators and the states; and
a multiplexer operable to multiplex outputs of the trace-back calculator with place holders corresponding to symbols of the first type.

6. The trellis decoder of claim 5, wherein the path metric calculator is operable to calculate a path error metric for a path through each state of the trellis decoder along a phase inverted trellis including a previous path error metric for that path and the minimum incremental error metric for at least two arriving paths for each state, the trellis decoder further comprising:
path metric registers for storing path metrics for each state along the phase inverted trellis; and
path memory operable to store a path indicator of each leg of each path associated with the minimum incremental error for that state along the phase inverted trellis, for arriving symbols of the second type, the path memory operable to store states of the trellis decoder along each of the paths of the phase inverted trellis for arriving symbols of the first type, arriving immediately prior to symbols of the second type along each of the paths.

* * * * *